US012258790B2

(12) United States Patent
Moonier

(10) Patent No.: US 12,258,790 B2
(45) Date of Patent: Mar. 25, 2025

(54) LOCKABLE CABINET SYSTEM AND LOCKING ASSEMBLY THEREFOR

(71) Applicant: True Manufacturing Company, Inc., O'Fallon, MO (US)

(72) Inventor: Christopher Moonier, O'Fallon, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 150 days.

(21) Appl. No.: 17/373,402

(22) Filed: Jul. 12, 2021

(65) Prior Publication Data

US 2023/0011232 A1 Jan. 12, 2023

(51) Int. Cl.

*E05B 63/00* (2006.01)
*E05B 47/00* (2006.01)
(Continued)

(52) U.S. Cl.

CPC ...... *E05B 65/0025* (2013.01); *E05B 47/0046* (2013.01); *E05B 63/0056* (2013.01);
(Continued)

(58) Field of Classification Search

CPC .... Y10S 292/53; Y10S 292/54; Y10S 292/60; Y10S 292/68; Y10S 292/71; E05B 63/0056
See application file for complete search history.

(56) References Cited

U.S. PATENT DOCUMENTS 365,152 A * 6/1887 Simson ................. E05B 55/005 292/DIG. 60
987,655 A * 3/1911 Thornley ............ E05B 63/0017 292/DIG. 68
(Continued)

FOREIGN PATENT DOCUMENTS

CN 108868374 A * 11/2018 ......... E05B 63/0056
CN 110242113 A 9/2019
(Continued)

OTHER PUBLICATIONS

Imbera Insight Health Lock, https://www.youtube.com/watch?v=ZUazZ566Ae0, uploaded on Nov. 9, 2020, by Brent Parkinson.
(Continued)

*Primary Examiner* — Carlos Lugo
(74) *Attorney, Agent, or Firm* — Stinson LLP

(57) ABSTRACT

In a locking assembly for a lockable cabinet system, a base supports an electronic lock for locking and unlocking the cabinet. The electronic lock may be releasably attachable to the base at a plurality of spaced apart positions. A one-piece release bar can be connected to an override toggle of the electronic lock. First and second electronic lock override devices may be connected to the release bar for independently overriding electronic actuation of the lock. The electronic lock may be supported on the base such that the electronic lock is separated from the wall of the cavity or the base by a gap. An externally adjustable cam lock can be provided to selectively override the electronic lock. Such
(Continued)

cam lock can further inhibit removal of a cover of the locking assembly when locked and allow removal of the cover when unlocked, thereby providing tamper-resistance.

20 Claims, 28 Drawing Sheets

(51) Int. Cl.

| | |
|---|---|
| ***E05B 65/00*** | (2006.01) |
| ***E05B 65/06*** | (2006.01) |
| *A47F 3/00* | (2006.01) |
| *A47F 3/04* | (2006.01) |

(52) U.S. Cl.

CPC .............. *E05B 65/06* (2013.01); *A47F 3/002* (2013.01); *A47F 3/043* (2013.01); *E05B 2047/0014* (2013.01); *E05B 2047/0072* (2013.01); *E05B 2047/0086* (2013.01)

(56) References Cited

U.S. PATENT DOCUMENTS

| | | | | | |
|---|---|---|---|---|---|
| 2,538,872 | A * | 1/1951 | Jones | E05B 17/0016 | 70/447 |
| 3,192,359 | A * | 6/1965 | Swindall | E05B 17/0016 | 219/202 |
| 3,296,416 | A | 1/1967 | Getman | | |
| 3,860,276 | A * | 1/1975 | Lambrecht | E05C 1/16 | 292/DIG. 60 |
| 3,866,961 | A * | 2/1975 | List | E05C 19/08 | 70/79 |
| 4,108,363 | A | 8/1978 | Susumu | | |
| 4,614,374 | A * | 9/1986 | Lannert | E05B 9/08 | 292/DIG. 68 |
| 4,703,961 | A * | 11/1987 | Weinerman | E05C 3/24 | 292/216 |
| 4,791,411 | A | 12/1988 | Staar | | |
| 4,800,741 | A | 1/1989 | Kerschenbaum et al. | | |
| 4,822,976 | A * | 4/1989 | Buranathanit | E05B 17/0016 | 219/202 |
| 5,246,258 | A | 9/1993 | Kerschenbaum et al. | | |
| 5,617,082 | A | 4/1997 | Denison et al. | | |
| 5,671,362 | A | 9/1997 | Cowe et al. | | |
| 6,108,188 | A | 8/2000 | Denison et al. | | |
| 6,345,522 | B1 | 2/2002 | Stillwagon et al. | | |
| 6,695,361 | B1 * | 2/2004 | Gleason | E05B 85/02 | 292/201 |
| 7,055,874 | B1 * | 6/2006 | Jeffries | E05B 9/08 | 292/DIG. 64 |
| 7,603,882 | B2 | 10/2009 | Carbajal et al. | | |
| 7,728,711 | B2 | 6/2010 | Shoenfeld | | |
| 7,938,458 | B1 * | 5/2011 | Zweibohmer | E05B 85/045 | 292/DIG. 60 |
| 8,029,029 | B2 * | 10/2011 | Terhaar | E05B 81/14 | 292/216 |
| 9,140,039 | B1 * | 9/2015 | Krishnan | E05B 85/04 | |
| 9,200,830 | B2 | 12/2015 | Oh et al. | | |
| 9,546,503 | B2 * | 1/2017 | Krueger | E05B 47/06 | |
| 9,915,082 | B2 * | 3/2018 | Garneau | E05B 65/46 | |
| 9,995,062 | B2 | 6/2018 | Yun | | |
| 10,143,763 | B2 | 12/2018 | Campalans et al. | | |
| 10,415,267 | B1 | 9/2019 | Schmutz | | |
| 10,495,377 | B2 | 12/2019 | Linney | | |
| 10,520,242 | B2 | 12/2019 | Denison et al. | | |
| 10,584,911 | B2 * | 3/2020 | Denison | F25D 23/028 | |
| 10,591,201 | B2 | 3/2020 | Denison et al. | | |
| 10,697,203 | B1 | 6/2020 | Gokcebay | | |
| 10,739,060 | B2 | 8/2020 | Denison et al. | | |
| 10,775,097 | B2 | 9/2020 | Denison et al. | | |
| 10,829,960 | B2 | 11/2020 | Denison et al. | | |
| 2007/0209413 | A1 | 9/2007 | Dobbs | | |
| 2008/0252083 | A1 | 10/2008 | Carabalona | | |
| 2009/0094127 | A1 | 4/2009 | Enqvist | | |
| 2010/0283360 | A1 | 11/2010 | Binder et al. | | |
| 2011/0056253 | A1 | 3/2011 | Greiner et al. | | |
| 2011/0238210 | A1 | 9/2011 | Roekens | | |
| 2011/0301749 | A1 | 12/2011 | Hammonds et al. | | |
| 2015/0035294 | A1 | 2/2015 | Milligan | | |
| 2016/0047146 | A1 | 2/2016 | Yun | | |
| 2016/0130840 | A1 | 5/2016 | Garneau | | |
| 2019/0063114 | A1 | 2/2019 | Attree et al. | | |
| 2020/0191469 | A1 | 6/2020 | Denison et al. | | |
| 2020/0386010 | A1 | 12/2020 | Lv et al. | | |
| 2021/0256791 | A1 | 8/2021 | Friend | | |

FOREIGN PATENT DOCUMENTS

| | | | | |
|---|---|---|---|---|
| DE | 102005024588 | A1 * | 11/2006 | E05B 81/14 |
| DE | 102019112220 | A1 | 11/2020 | |
| EP | 1260657 | A1 | 11/2002 | |
| EP | 1348824 | A1 | 10/2003 | |
| EP | 2532814 | B1 | 3/2014 | |
| JP | S63146066 | U * | 9/1988 | |
| JP | 4727101 | B2 | 7/2011 | |
| KR | 100648047 | B1 | 11/2006 | |
| KR | 101104644 | B1 | 1/2012 | |
| WO | 2020130920 | A1 | 6/2020 | |

OTHER PUBLICATIONS

U.S. Appl. No. 17/244,553, by Knatt et al., filed Apr. 29, 2021.

Partial European Search Report from EP Application No. 22184220.6, dated Dec. 20, 2022, 14 pages.

Examination Report from CA Application No. 3167423, dated Nov. 10, 2023, 7 pages.

Extended European Search Report from EP Application No. 22184220.6, dated May 24, 2023, 15 pages.

* cited by examiner

LOCKABLE CABINET SYSTEM AND LOCKING ASSEMBLY THEREFOR

FIELD

The present disclosure relates to a lockable cabinet system (e.g., a temperature controlled cabinet system or sanitizing cabinet system) and locking assembly therefor.

BACKGROUND

Lockable cabinet systems are used in various applications. For example, some lockable cabinet systems provide temperature control. These include coolers, freezers, and warming cabinets, which are in wide commercial use. Lockable cabinet systems are also used for other applications, such as sanitizing cabinets and ambient temperature vending.

Lockable cabinet systems comprise a cabinet with one or more doors on the front side of the cabinet for selectively opening and closing the cabinet. In certain circumstances, it may be desirable to lock the cabinet closed so that unauthorized access is prevented. Some lockable temperature-controlled storage cabinets employ electronic locks. Electronic locks enable selective locking and unlocking based on electronic signals provided by one or more controllers.

In certain vending applications, a temperature controlled storage cabinet may be maintained in a locked configuration until payment has been presented, at which point a controller can send a control signal to an electronic door lock to automatically unlock the cabinet. An exemplary vending system of this type is described in U.S. patent application Ser. No. 17/176,637, which is hereby incorporated by reference in its entirety.

Electronic locks may also be used for health and safety purposes. For example, when a storage cabinet is used to hold temperature-critical goods, a control system can be configured to automatically lock the cabinet in response to certain out-of-range temperature conditions, equipment failure, power loss, or other events where spoliation is possible.

Further, a control system can be configured to automatically lock a temperature controlled storage cabinet when there is a power outage so that the temperature conditioned air at the time of power loss remains sealed inside the cabinet while additional power for heating or cooling is unavailable.

As explained in U.S. patent application Ser. No. 17/244,553, which is hereby incorporated by reference in its entirety, a controller can control an electronic lock in a sanitizing cabinet to ensure that the door remains closed during a sanitizing routine.

SUMMARY

In one aspect, a locking assembly for a lockable cabinet system comprises a base configured to mount on the cabinet system. An electronic lock is configured to be selectively actuated to lock and unlock the temperature controlled cabinet system. the electronic lock is releasably attachable to the base at a plurality of spaced apart positions.

In another aspect, a locking assembly for a lockable cabinet system comprises a base configured to mount on the cabinet system. An electronic lock is supported on the base. The electronic lock is configured to be electronically actuated to adjust between a locking configuration in which the electronic lock is configured to lock the cabinet system and an unlocked configuration in which the electronic lock is configured to unlock the cabinet system. The electronic lock includes a mechanical release toggle movable relative to the base independently of electronic actuation to override the electronic lock in the locking configuration such that the cabinet system is unlocked. A one-piece release bar is supported on the base and movable relative to the base between a normal position and a release position. The one-piece release bar is configured to move the movable toggle relative to the base to override the electronic lock as the one-piece release bar moves from the normal position to the release position. First and second electronic lock override devices are connected to the release bar such that each of the first and second electronic lock override devices can independently move the release bar from the normal position to the release position.

In another aspect, a locking assembly for a cabinet system comprises a base configured to mount the locking assembly within a cavity formed in an insulated wall of the cabinet system. The cavity comprises a closed inner end adjacent an interior of the cabinet system and an open outer end spaced apart from the closed inner end along a wall thickness of the insulated wall. The open outer end opens to an exterior of the cabinet system. An electronic lock is configured to be selectively actuated to lock and unlock the cabinet system. The electronic lock is supported on the base such that the electronic lock is separated from the closed inner end of the cavity by a gap.

In another aspect, a locking assembly for a cabinet system comprises a base configured to mount the locking assembly within a cavity formed in a wall of the cabinet system. An electronic lock is supported on the base. The electronic lock is configured to be electronically actuated to adjust between a locking configuration in which the electronic lock is configured to lock the cabinet system and an unlocked configuration in which the electronic lock is configured to unlock the cabinet system. A cover is configured to releasably connect to the electronic lock to cover the electronic lock within the cavity. An externally adjustable cam lock is movable independently of the electronic lock between a locked position and an unlocked position. The cam lock is configured to override the electronic lock in the unlocked position such that the cabinet system is unlocked. The cam lock is further configured to inhibit removal of the cover in the locked position and to allow removal of the cover in the unlocked position.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
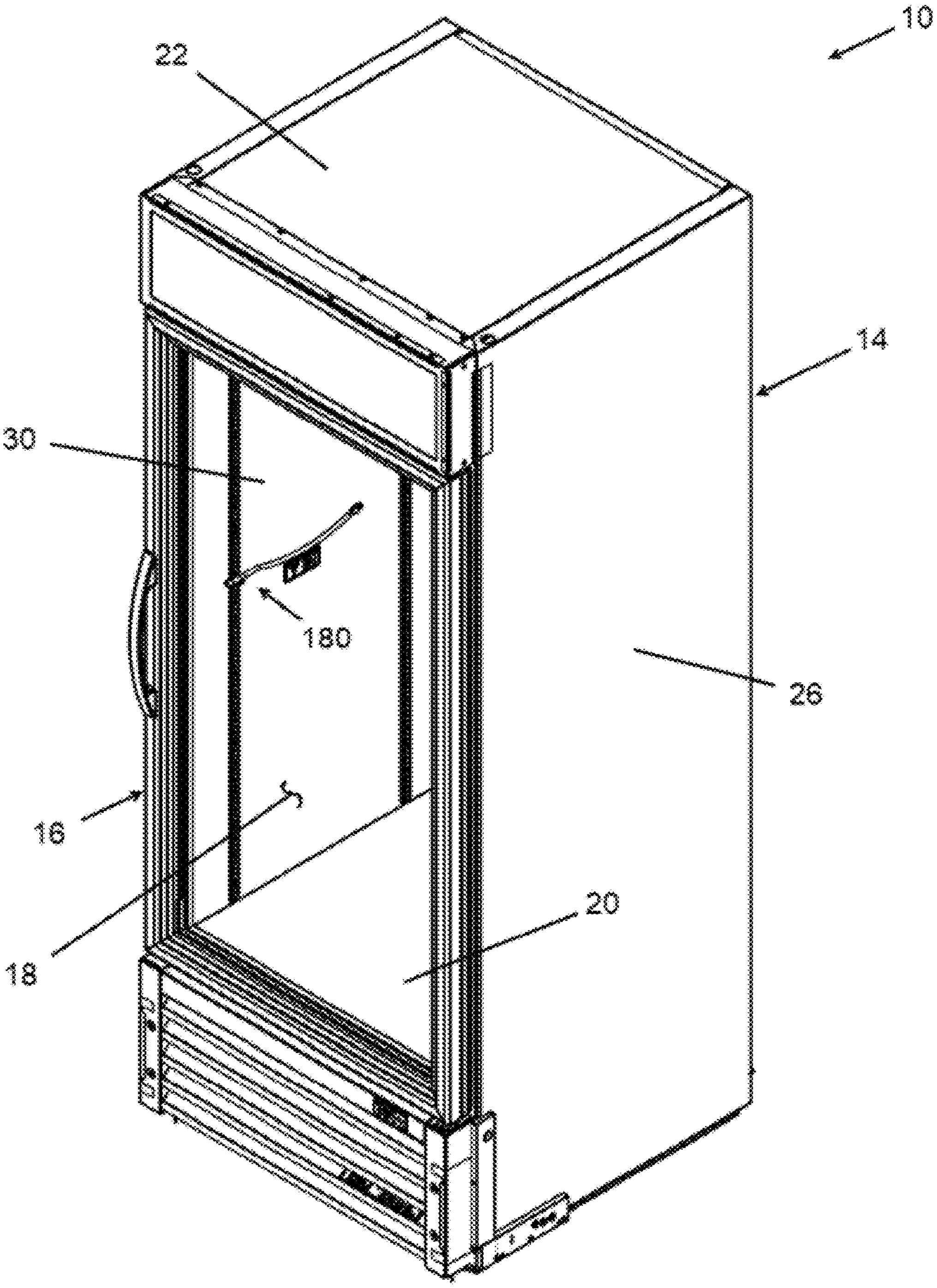
FIG. 1 is a perspective of a lockable cabinet system.
Figure 2:
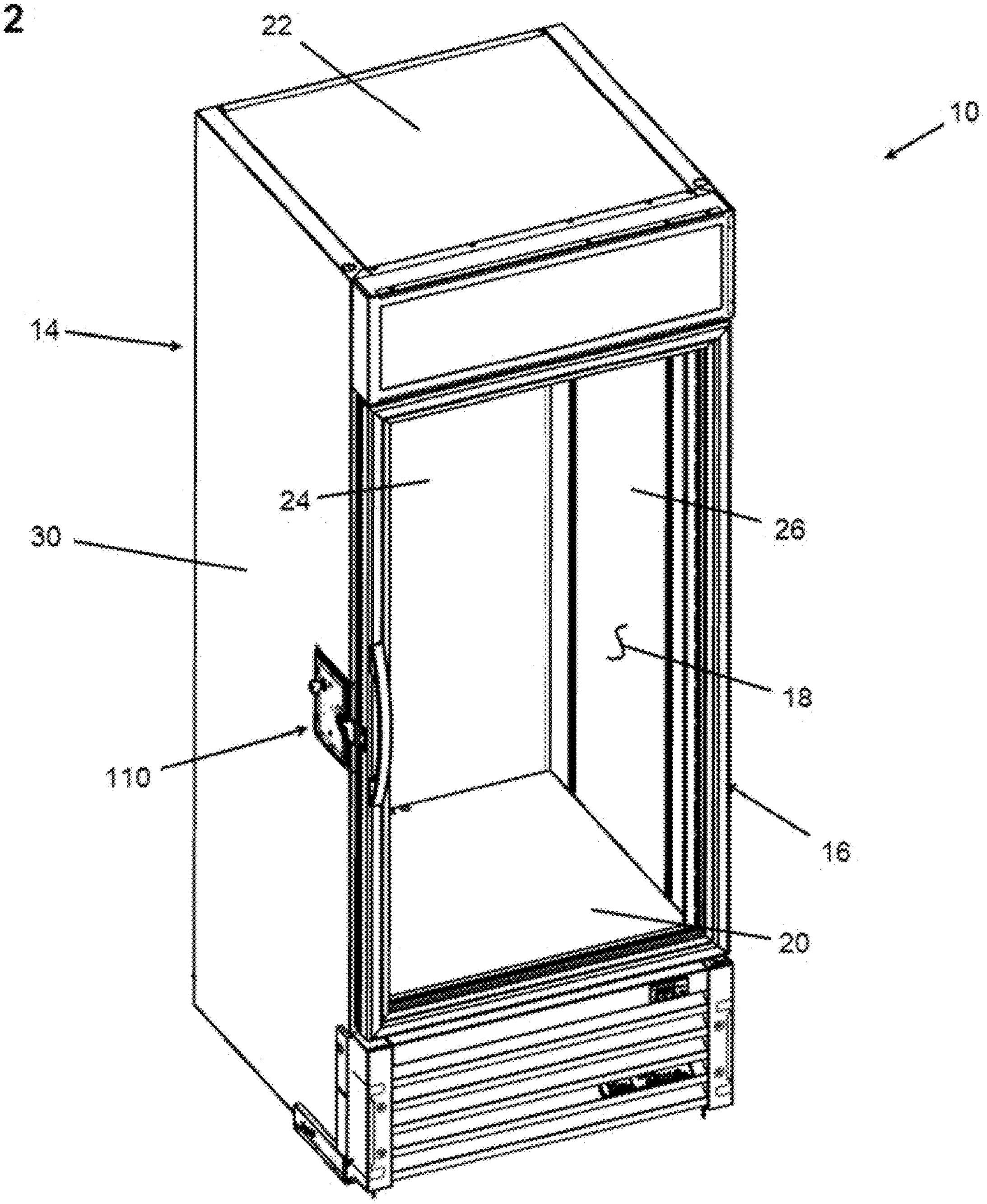
FIG. 2 is another perspective of the lockable cabinet system.
Figure 3:
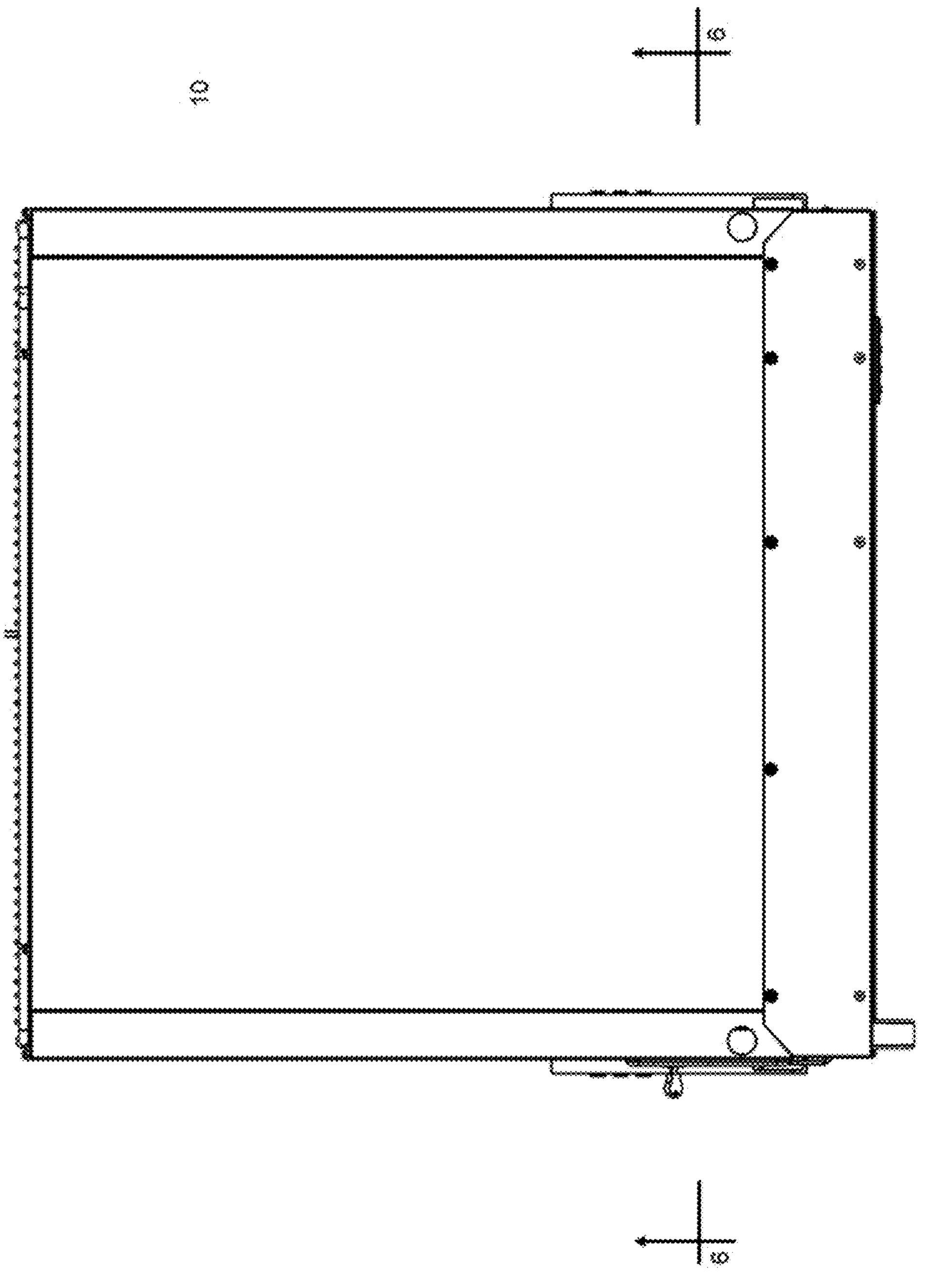
FIG. 3 is a top plan view of the lockable cabinet system.
Figure 4:
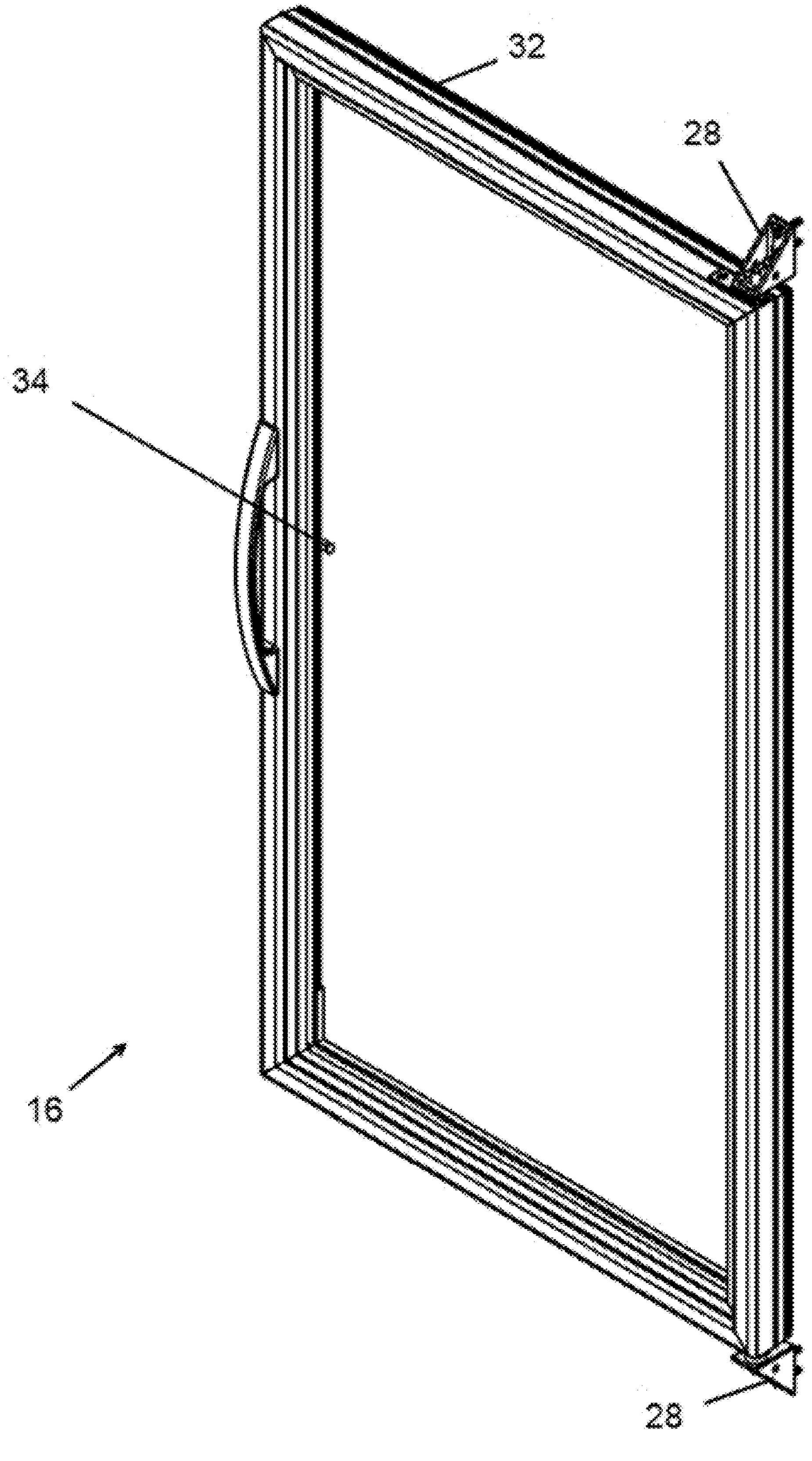
FIG. 4 is a perspective of a door of the lockable cabinet system.
Figure 5:
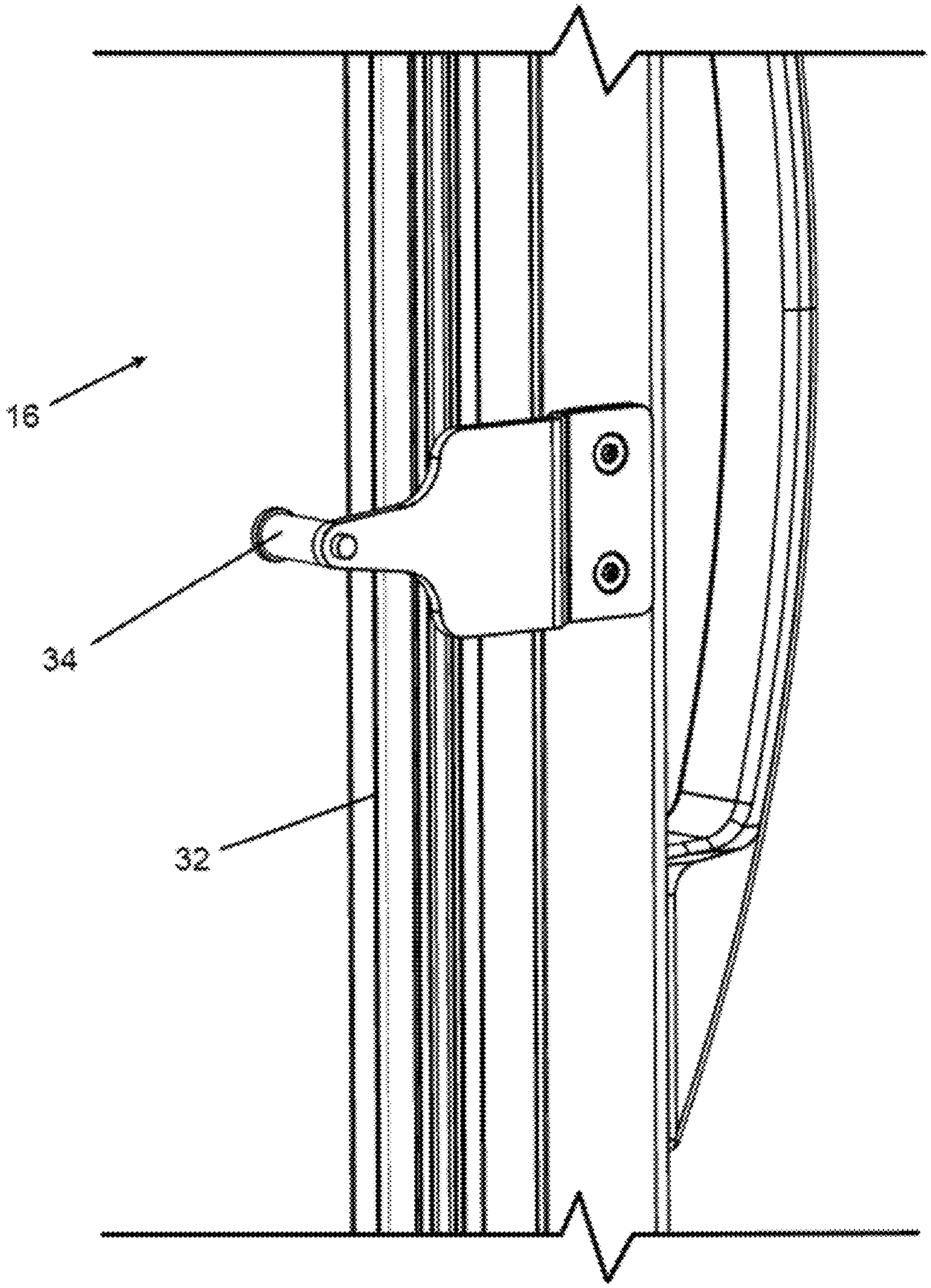
FIG. 5 is an enlarged fragmentary perspective of a portion of the door.
Figure 6:
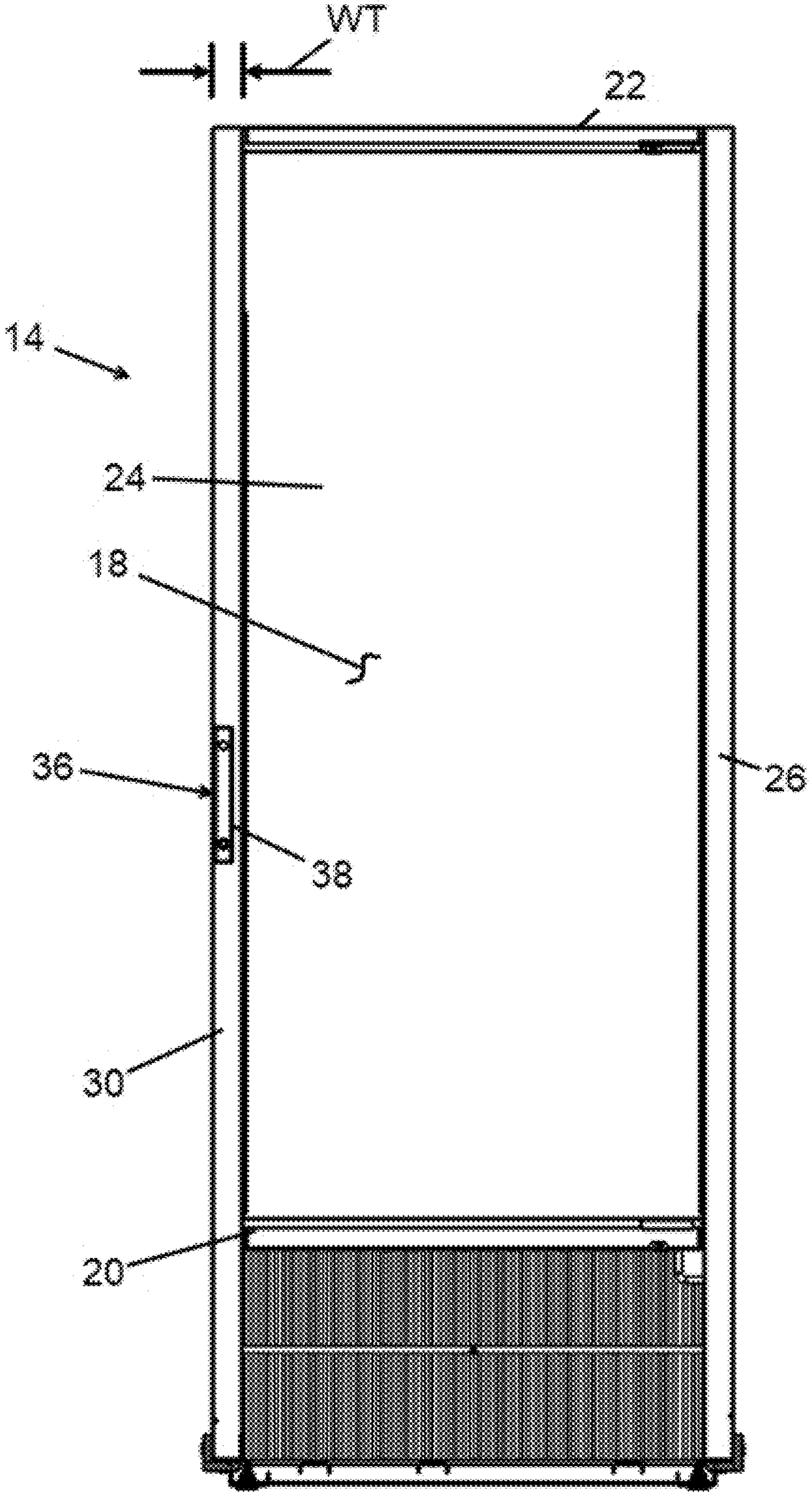
FIG. 6 is a cross-section taken through the plane of line 6-6 of FIG. 3; wherein a locking assembly has been removed from the lockable cabinet system.
Figure 7:
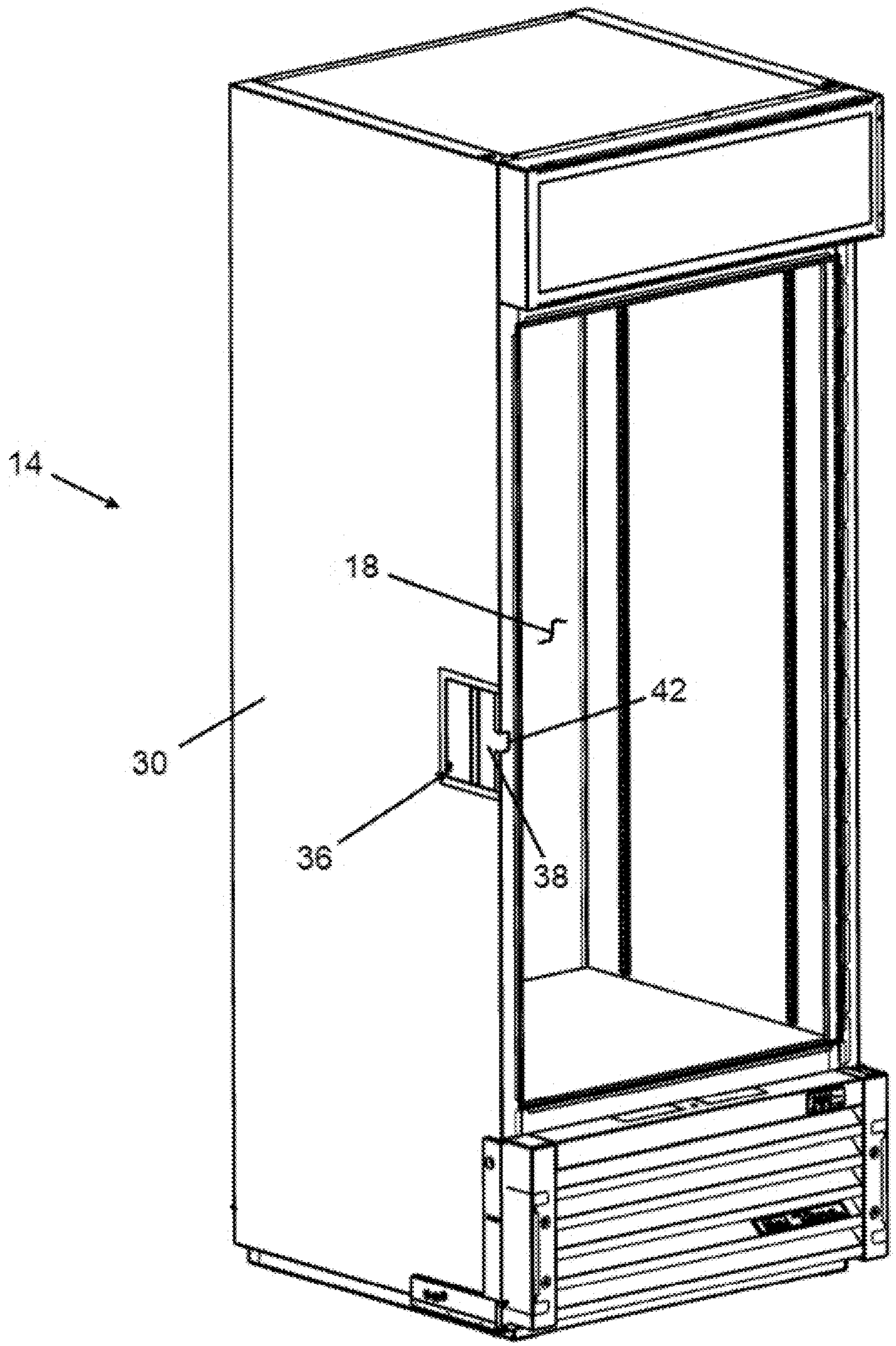
FIG. 7 is a perspective of the lockable cabinet system wherein the door and the locking assembly are removed.
Figure 8:
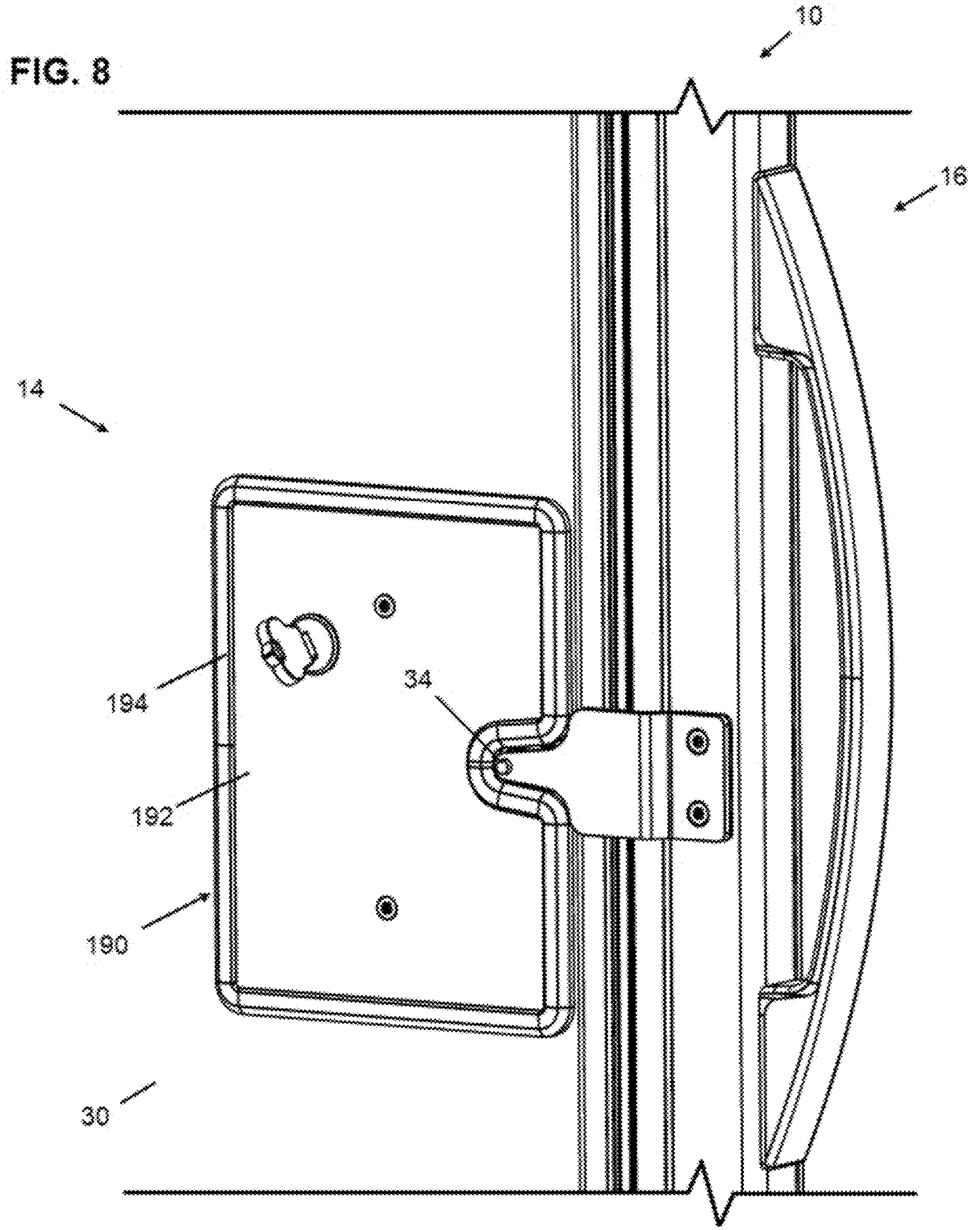
FIG. 8 is an enlarged fragmentary perspective of a portion of the lockable cabinet system.
Figure 9:
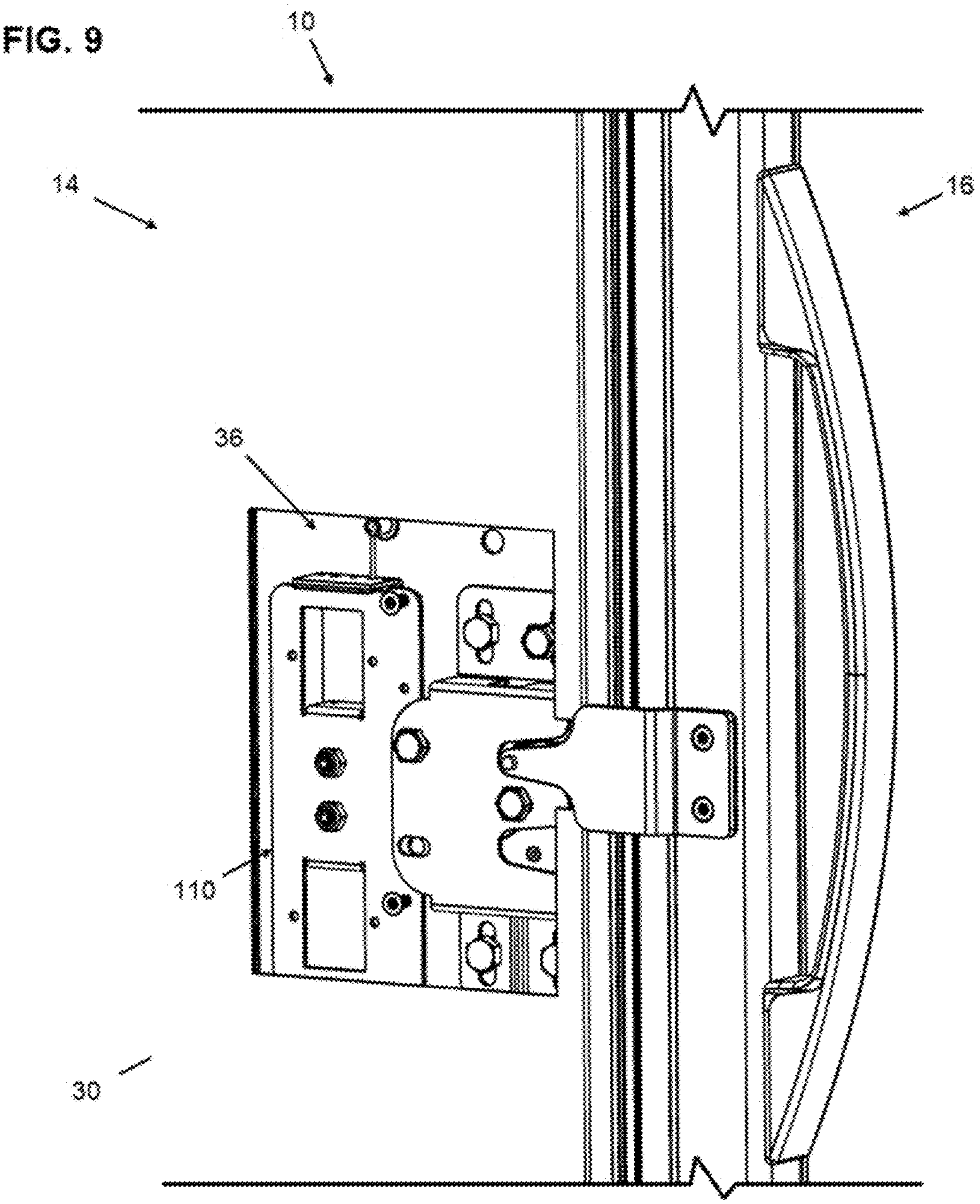
FIG. 9 is an enlarged fragmentary perspective similar to FIG. 9 wherein a cover assembly of the locking assembly is removed.
Figure 10:
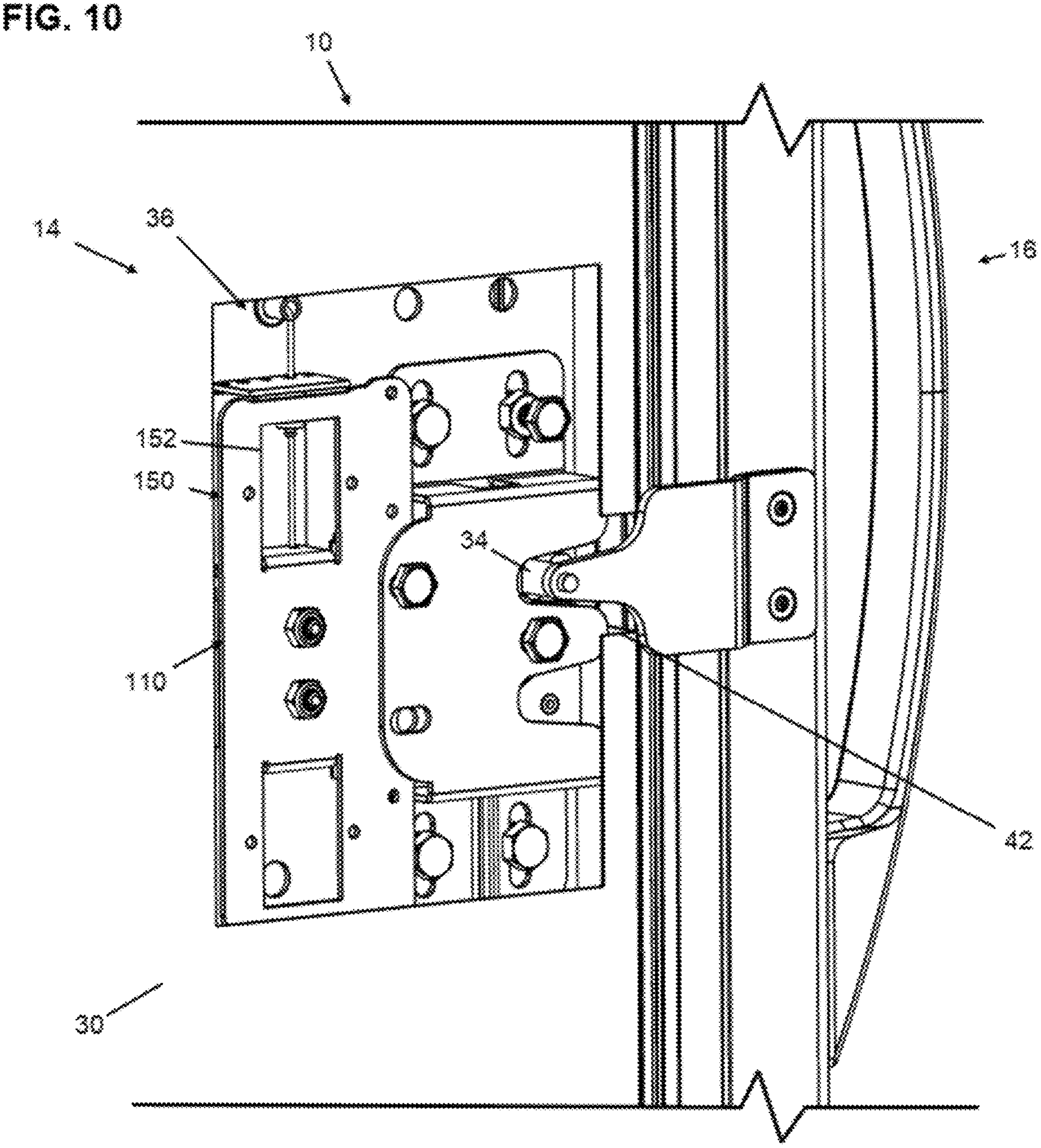
FIG. 10 is another enlarged fragmentary perspective of the lockable cabinet system wherein the cover assembly is removed.
Figure 11:
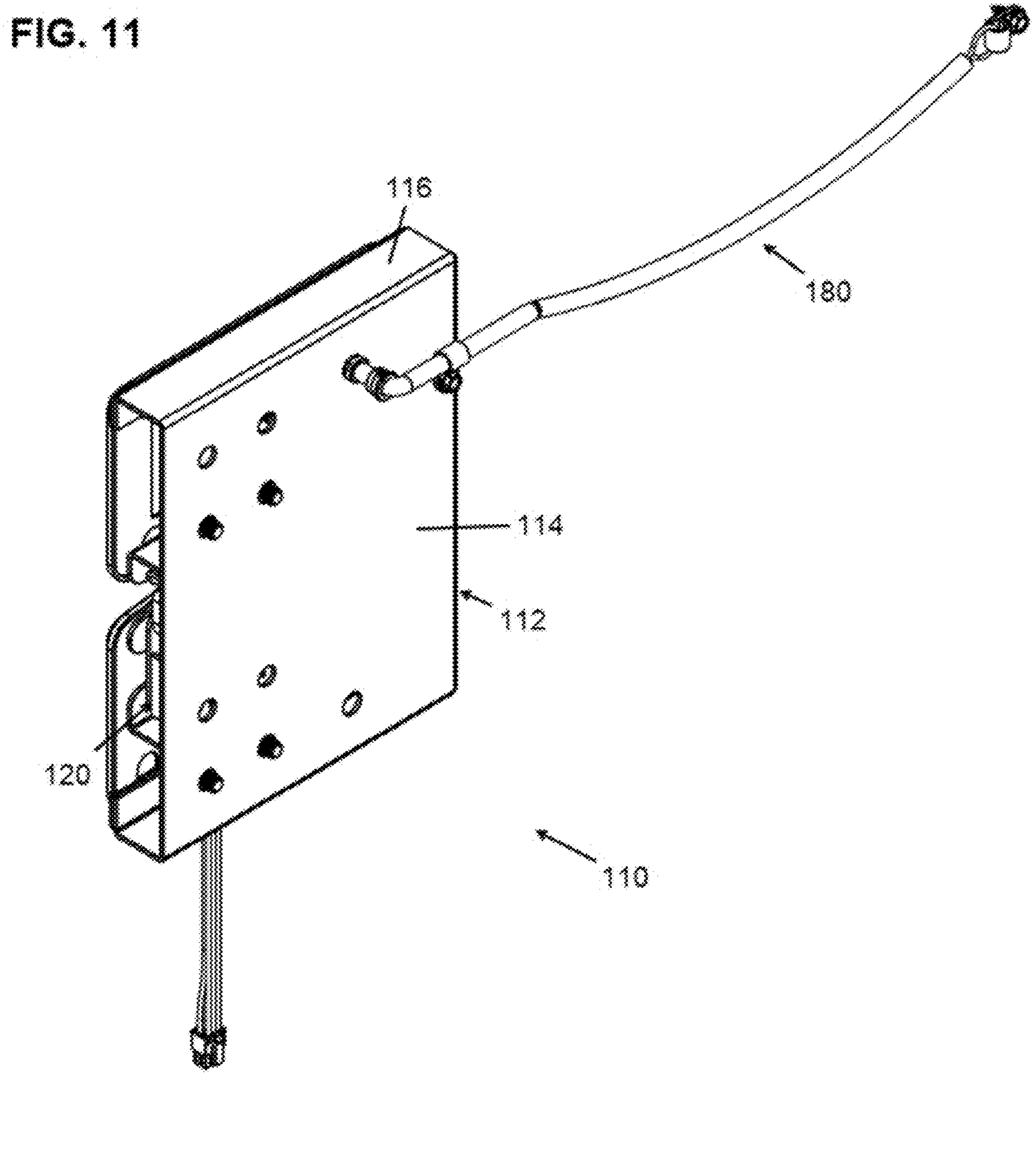
FIG. 11 is a perspective of the locking assembly.

Referring now to FIGS. 1-10, one embodiment of a lockable cabinet system in the scope of this disclosure is generally indicated at reference number 10. The cabinet system 10 generally comprises a cabinet 14 and a door 16 movably connected to the cabinet for opening and closing the cabinet. In the illustrated embodiment, the cabinet system 10 comprises a single hinged door. However, it will be understood that the principles of the present disclosure can also be used for multi-door cabinets and sliding door cabinets. The cabinet 14 defines a storage compartment 18 accessible when the door 16 is open. In one or more embodiments, the cabinet system 10 is a temperature controlled cabinet system. In these embodiments, the cabinet system 10 comprises a suitable temperature control system for controlling the temperature inside the storage compartment 18 as required by the application. In some cases, the temperature controlled cabinet system 10 comprises a refrigeration system (e.g., a vapor-compression refrigeration system and/or a thermoelectric refrigeration system) configured to cool the storage compartment 18 to refrigeration temperatures (e.g., temperatures less than 41° F.), freezer temperatures (e.g., temperatures less than 0° F.), or other sub-ambient temperature ranges. In other embodiments, the temperature controlled cabinet system 10 comprises a heater configured to maintain the storage compartment 18 at above-ambient temperature ranges, e.g., temperature ranges suitable for keeping prepared foods warm. Still other temperature controlled cabinet systems 10 in the scope of the disclosure can comprise both refrigeration systems and heating systems so that the cabinet system could be selectively used in a warming mode or a chilling mode. Other types of lockable cabinet systems can also be used. For example, in one embodiment, the cabinet system 10 comprises a sanitizing cabinet system of the type disclosed in U.S. patent application Ser. No. 17/244,553, an ambient temperature vending cabinet system, or other suitable cabinet system.

In the illustrated embodiment, the cabinet 14 comprises a bottom wall 20, a top wall 22, a rear wall 24, a hinged sidewall 26 to which the door 16 is connected by hinges 28 (FIG. 4), and a non-hinged sidewall 30 opposite the hinged sidewall. Each of the bottom wall 20, the top wall 22, the rear wall 24, the hinged sidewall 26, and the non-hinged sidewall 30 can suitably comprise insulation for limiting heat transfer between the storage compartment 18 and the ambient environment. The door 16 has a hinged edge margin connected to the hinged sidewall 26 by the hinges 28 such that the door can swing open and closed by rotation on the hinges. In the closed position, a gasket 32 seals the interface between the door 16 and the cabinet to inhibit air transfer between the closed storage compartment 18 and the ambient environment. In the illustrated embodiment, a strike 34 is attached to the non-hinged side margin of the door 16 for interfacing with a locking assembly 110 supported on the non-hinged sidewall 30 when the door 16 is closed. As will be explained in further detail below, the locking assembly 110 is configured to selectively lock and unlock the door by engagement with the strike 34.

The non-hinged sidewall 30 of the cabinet 14 defines a cavity 36 (FIGS. 6 and 7) configured to receive the locking assembly 110 therein. For example, the cavity 36 may be formed as a depression or recess in the insulation of the sidewall 30. The cavity may be bounded by structure that closely conforms to the exterior of the locking assembly 110 or the cavity may be oversized in relation to the locking assembly. The non-hinged sidewall 30 has an interior side and an exterior side spaced apart along a wall thickness WT. The cavity comprises a closed inner end 38 adjacent to the interior side of the wall 30 and (e.g., adjacent the storage compartment 18) and an open outer end that opens through the exterior side of the cabinet. In one or more embodiments, the cavity 36 is formed so that the inner end 38 is spaced apart from the interior side of the sidewall 30 along the wall thickness WT. This allows for some insulation between the storage compartment 18 and the cavity 36. The sidewall 30 further defines a strike recess 42 through which the strike 34 passes into the cavity 36 as the door 16 is closed.

Although the illustrated cabinet system 10 positions the locking assembly cavity 36 in the non-hinged sidewall 30, those skilled in the art will recognize that a locking assembly cavity could be located on any wall that interfaces with the door in the closed position so that a strike on the door can enter the locking assembly as the door moves from open to closed. Alternatively, the locking assembly could be mounted on the door and the strike could be positioned on the cabinet, in one or more embodiments.

Referring to FIGS. 11-14, the illustrated locking assembly 110 generally comprises a base 112 that is configured to support the remainder of the locking assembly in the cavity 36. Thus, the base 112 is broadly configured to mount the locking assembly 110 within the cavity. The illustrated base 112 comprises an inner end wall 114 and a perimeter flange 116 extending along three sides of the inner end wall. The illustrated base 112 is configured to be fixed onto the non-hinged sidewall 30 of the cabinet such that the inner end wall 114 extends along/on the inner end 38 of the cavity 36. In an exemplary embodiment, the base 112 attaches to the sidewall by high bond double-sided tape. Spray-in foam insulation is then deposited into the sidewall around the locking assembly 110. The base 112 may also attach to the sidewall 30 by screws or other fasteners that fix the base in place on the wall.

Figure 15:
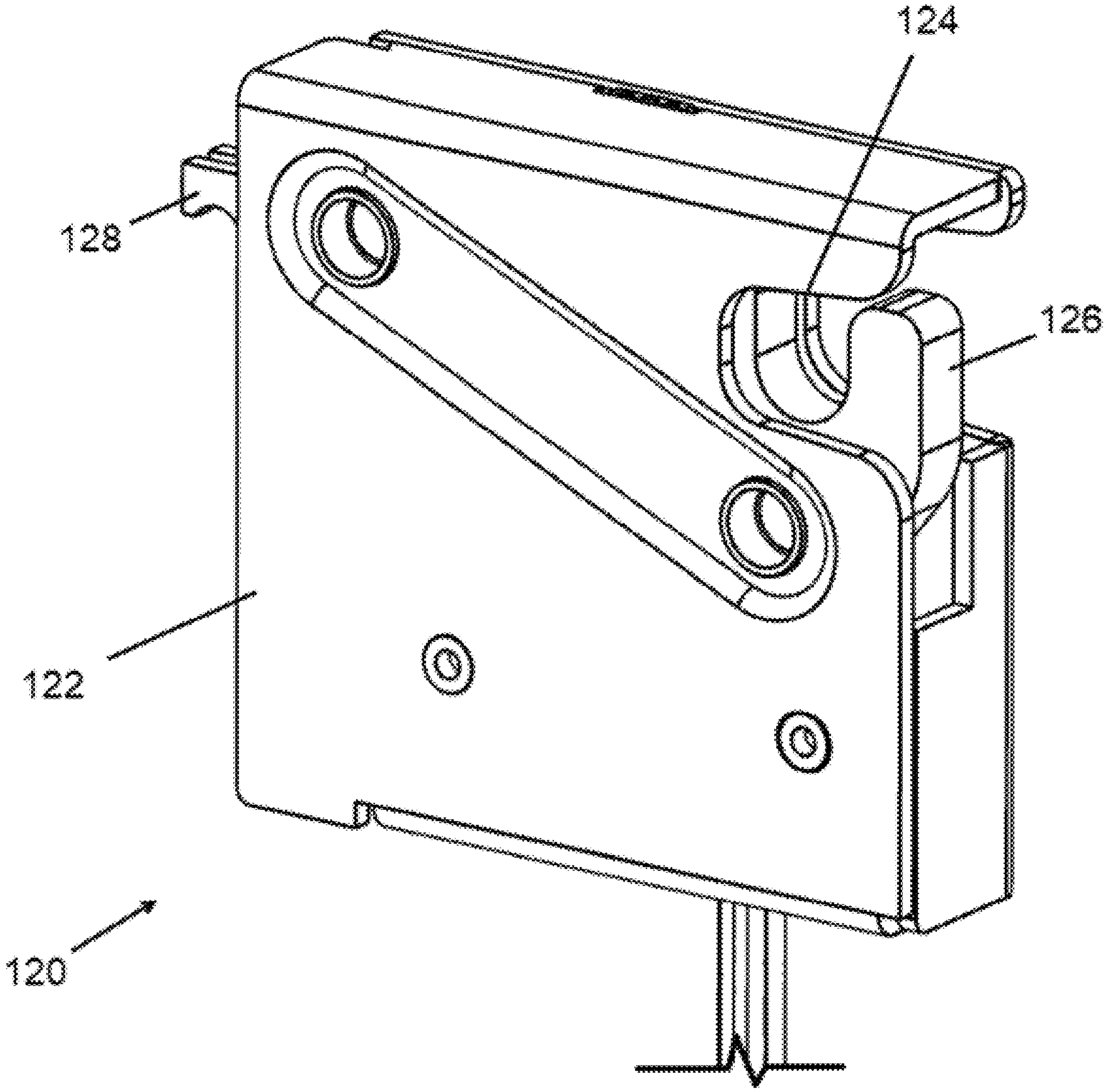
FIG. 15 is a perspective of an electronic lock of the locking assembly.

The illustrated locking assembly 110 further comprises an electronic lock 120 that is configured to be electronically actuated to adjust between a locking configuration in which the electronic lock is configured to lock the temperature controlled cabinet system 10 and an unlocked configuration in which the electronic lock is configured to unlock the temperature controlled cabinet system. Referring to FIG. 15, the illustrated electronic lock comprises a housing 122 defining a strike recess 124 configured to receive the strike 34 as the door 16 is closed. A cam latch 126 is connected to the housing 122 for movement between a latching position shown in the drawings and an unlatching position (not shown). When the door is closed and the cam latch 126 is in the latching position, the strike 34 is captured in the recess 124 between the housing 122 and the cam latch. That is, in the latching position, the cam latch 126 is positioned to close the open end of the strike recess 124. By contrast, in the unlatching position (not shown), the cam latch 126 will be positioned to open the recess, allowing the strike 34 to enter the recess.

The electronic lock is electronically actuated to selectively lock and unlock the cam latch 126 in the latching position. In the locked configuration, the electronic lock 120 locks the cam latch 126 in the latching position; whereas in the unlocked configuration, the electronic lock unlocks the cam latch, allowing the cam latch to move between the latching and unlatching positions. In one or more embodiments, when the electronic lock is in the unlocked configuration, the strike 34 moves the cam latch 126 between the latching and unlatching positions by as it opens and closes. The strike 34 will move the cam latch 126 of an unlocked electronic lock 120 to the unlatching position as the door opens and moves the cam latch 126 to the latching position as the door closes.

Various electronic actuators and optional linkages may be used to lock and unlock the cam latch 126 (broadly, adjust between the locking configuration and the unlocking configuration) without departing from the scope of the disclosure. In the illustrated embodiment, the electronic lock 120 comprises a Southco R4 lock that utilizes an electronic motor and set of gears to lock and unlock the cam latch 126 in the latching position. An exemplary embodiment of a motor-driven electronic lock of this type is described more fully in U.S. Patent Application Publication No. 2016/0130840A1, which is hereby incorporated by reference in its entirety. Other types of electronic door locks are also known and may be used without departing from the scope of the disclosure. For instance, it is expressly contemplated that, in one or more embodiments, the electronic lock 120 comprises a high voltage solenoid or a low voltage solenoid actuator in lieu of an electric motor.

The illustrated electronic lock 120 further comprises a manual/mechanical release toggle 128 extending from the housing 122. The mechanical release toggle 128 is movable relative to the housing 122 to mechanically override the electronic lock in the locked configuration. The mechanical release toggle 128 unlocks the door so that it can be opened without requiring electronic actuation of the lock. From the position shown in FIG. 12, the toggle 128 moves upward to manually release the electronic lock 120.

Figure 17:
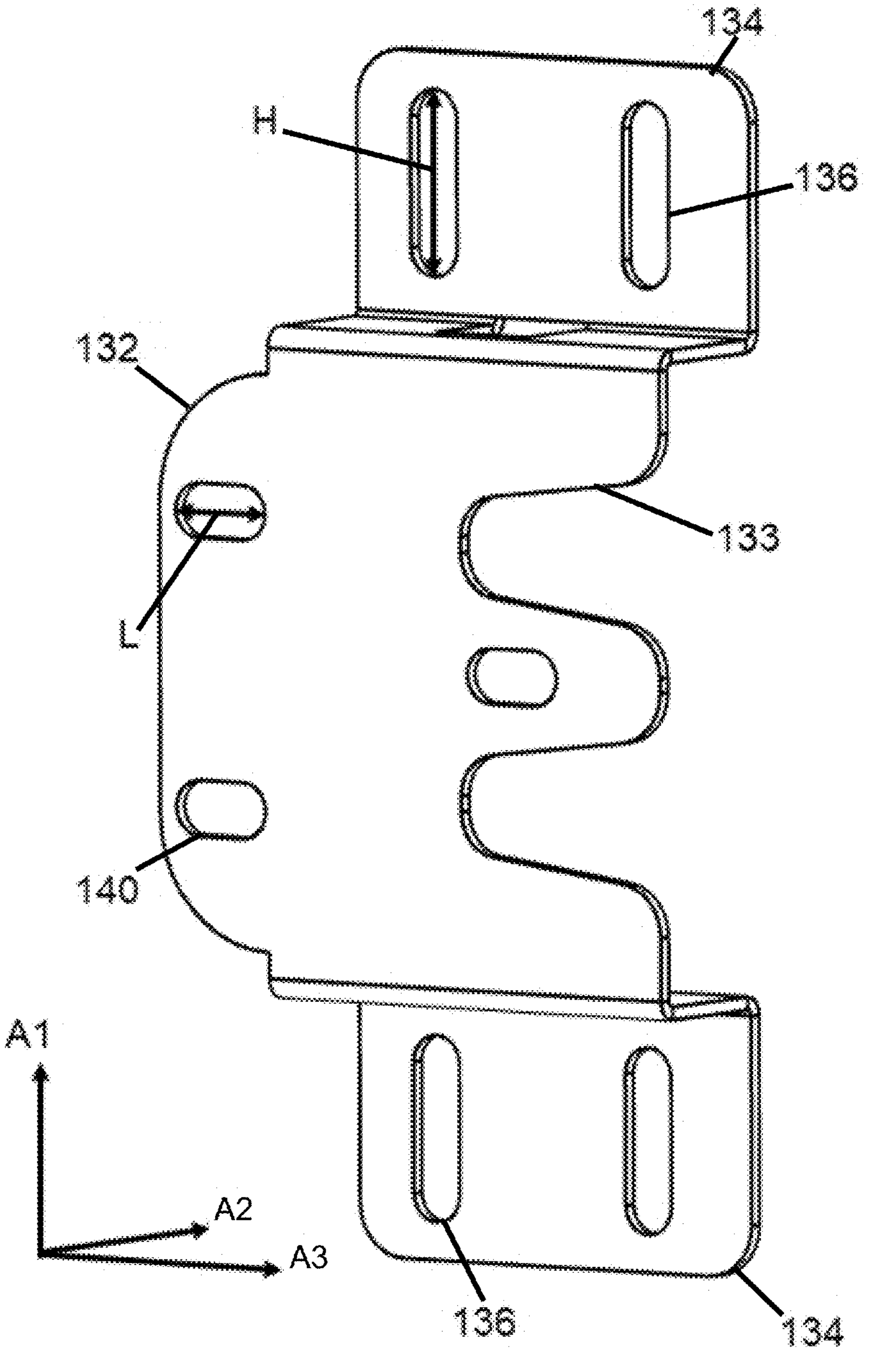
FIG. 17 is a perspective of a support bracket of the locking assembly.

In the illustrated embodiment, the locking assembly 110 is configured so that the electronic lock 120 is releasably attachable to the base 112 at a plurality of spaced apart positions, e.g., positions spaced apart along a vertical axis A1 (broadly, a first axis) and positions spaced apart along a front-to-back axis A2 (broadly, a second axis perpendicular to the first axis). In the illustrated embodiment, a separate support bracket 130 adjustably mounts the electronic lock 120 on the base 112. Referring to FIG. 17, the illustrated support bracket 130 comprises a central cradle portion 132 in which the support bracket receives the electronic lock. The cradle portion 132 defines a strike recess 133 configured to align with the strike recess 124 of the electronic lock housing 122 so that the strike 134 can engage with the lock while the lock is supported in the cradle portion 132. Upper and lower flange portions 134 extend vertically from the cradle portion 132.

Figure 16:
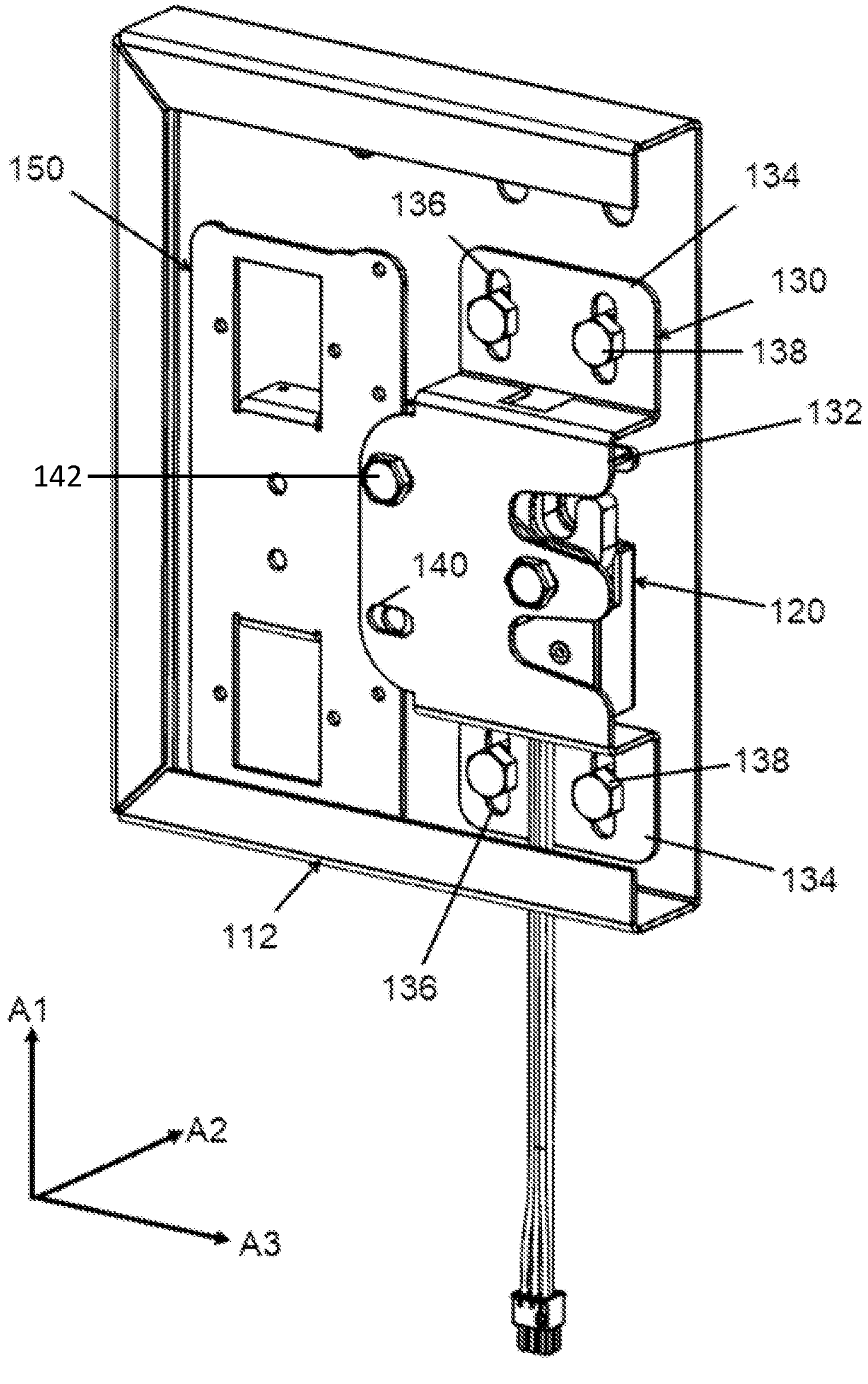
FIG. 16 is a perspective of the locking assembly wherein the cover assembly and a release system are removed.

The upper and lower flange portions 134 include elongate mounting slots 136 that extend lengthwise in the vertical direction. In one or more embodiments, each mounting slot 136 has a height H along the vertical axis A1 of at least 0.25 inches (e.g., at least 0.5 inches). As shown in FIG. 16, screws 138 extend through the mounting slots 136 and are threaded into nuts 148 attached to the base end wall 114. It can be seen that the mounting bracket 130 can be releasably fastened to the base 112 at any position along the vertical axis A1 within a vertical positioning range corresponding to the height H of the slots 136. That, is the screws 138 can be loosened and then the mounting bracket may slide along the vertical axis A1 to any desired position in the vertical positioning range inclusive of a lower end position where the screws 138 engage the flange portions 134 at the top ends of the slots 136 to an upper end position at which the screws engage the flange portions at the bottom ends of the slots. The cradle portion 132 constrains and supports the electronic lock 120 so that the electronic lock moves with the support bracket 130 along the vertical axis A1. Thus, the illustrated locking assembly 110 is configured so that the electronic lock 120 has a vertical positioning range with respect to the base 112 extending along the vertical axis A1 from a lower end position to an upper end position and the electronic lock is releasably attachable to the base at any position in the vertical positioning range.

The cradle portion 132 of the support bracket 130 also includes an elongate mounting slots 140 that extend lengthwise in the front-to-back horizontal direction. In one or more embodiments, each mounting slot 140 has a length L (FIG. 17) along the front-to-back axis A2 of at least 0.25 inches. Screws 142 extend through the mounting slots 140 and are threaded into pre-threaded holes formed in the electronic lock housing 122. It can be seen that the electronic lock 120 can therefore be releasably fastened to the support bracket 130 at any position along the front-to-back axis A2 within a front-to-back positioning range corresponding to the length L of the slots 140. That is, the screws 142 can be loosened and then the electronic lock 120 may slide along the front-to-back axis A2 to any desired position in the front-to-back positioning range, which extends from a front end position where the screws 142 engage the bracket 130 at the front ends of the slots to a rear end position where the screws engage the bracket at the back ends of the slots. Thus, the illustrated locking assembly 110 is configured so that the electronic lock 120 has a front-to-back positioning range with respect to the base 112 extending along the front-to-back axis A2 from a front end position to a rear end position and the electronic lock is releasably attachable to the base at any position in the front-to-back positioning range.

The inventors believe that the positional adjustment enabled by the support bracket 130 can enhance both the manufacture and long-term maintenance of the lockable cabinet system 10. During manufacture, the assembler can make fine positional adjustments to the electronic lock along both the vertical axis A1 and the front-to-back axis A2 to ensure operative alignment of the electronic lock 120 with the door strike 34 in every cabinet system 10 produced. Furthermore, the inventors have recognized that cabinet doors sometimes sag and/or twist, for example, due to misuse. This can lead to misalignment between the electronic lock 120 and the door strike 34 and ultimately cause unreliable operation or a complete inoperative failure of the locking system. The mounting bracket 130 of the illustrated locking assembly enables easy adjustment of the position of the electronic lock so that, if the position of the closed door 16 changes over time, the mounted position of the electronic lock 120 on the cabinet 14 can be adjusted to account for the changes, thereby enabling proper alignment between the strike 34 and the electronic lock to be maintained over the life of the cabinet system. Misalignment between the strike 34 and the lock 120 along a lateral axis A3 can be addressed by shimming the strike on the door.

Figure 18:
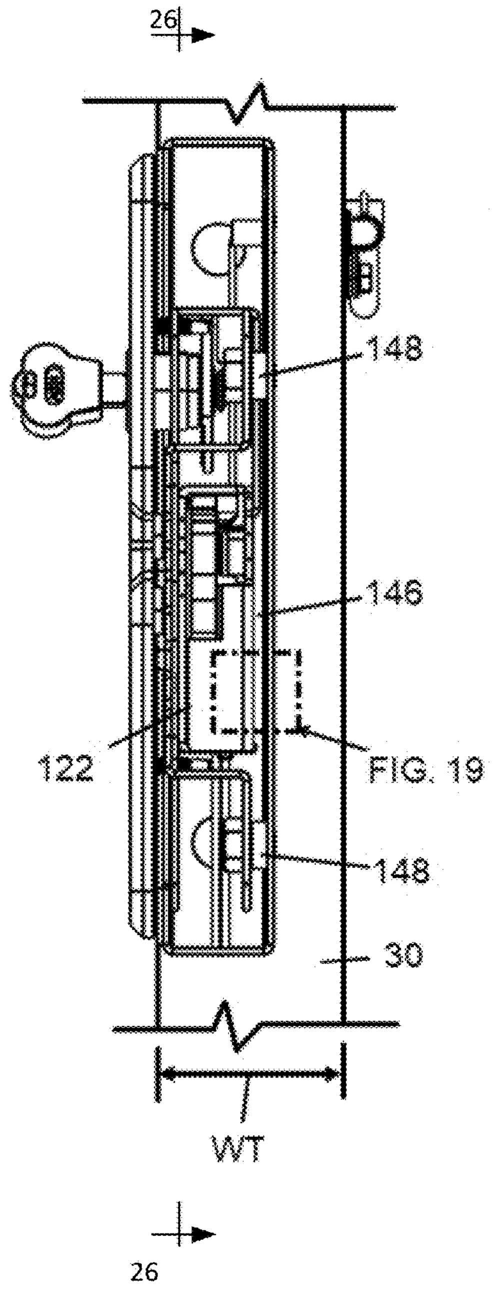
FIG. 18 is a side elevation of the locking assembly shown on a schematically illustrated fragmentary portion of a sidewall of the cabinet system.
Figure 19:
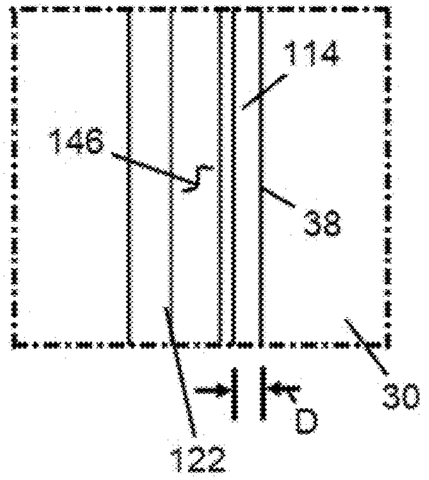
FIG. 19 is an enlarged view of a portion of FIG. 18.

Referring to FIGS. 18 and 19, in one or more embodiments, the support bracket 130 supports the electronic lock 120 on the base 112 such that the electronic lock is separated from the inner end 38 of the cavity 36 by a gap 146. More particularly, in the illustrated embodiment, an air gap 146 extends between the inner end of the electronic lock housing 122 and the end wall 114 of the base 112. No portion of the electronic lock 120 is in direct contact with the base end wall 114 or the inner end 38 of the cavity 36. In the illustrated embodiment, the nuts 148 are placed between the flange portions 134 of the support bracket 130 and the base end wall 114. The nuts 148 position the flange portions such that the flange portions are spaced apart outwardly from the base end wall 114 along the wall thickness WT of the wall 30. It is contemplated that the nuts 148 (broadly, spacers) may be formed form thermally nonconductive material in order to limit thermal conduction between the base 112 and the support bracket 130. In one or more embodiments the gap 146 has a dimension D along the wall thickness WT (along the lateral axis A3) of at least 0.125 inches (e.g., in a range of from 0.125 inches to 0.3125 inches). In certain embodiments, a heater (e.g., an electrical resistance heating wire) is received in the gap 146 between the electronic lock 20 and the end wall 114. For instance, a resistance heater wire having a diameter of 0.110 inches can fit in the widest portion of the gap 146 of the illustrated locking assembly 110.

The gap 146 between the electronic lock 120 and the storage compartment 18 insulates the electronic lock from temperature conditions inside the cabinet, and moreover, provides space for a heater. The inventors have recognized that cold conditions inside temperature controlled storage cabinets, particularly freezers, can cause condensation to form on an electronic lock, adversely affecting operation and reliability. The insulation and/or active heating facilitated by the gap 146 can limit condensation on the electronic lock and thus improve the reliability of the locking assembly 110.

Figure 20:
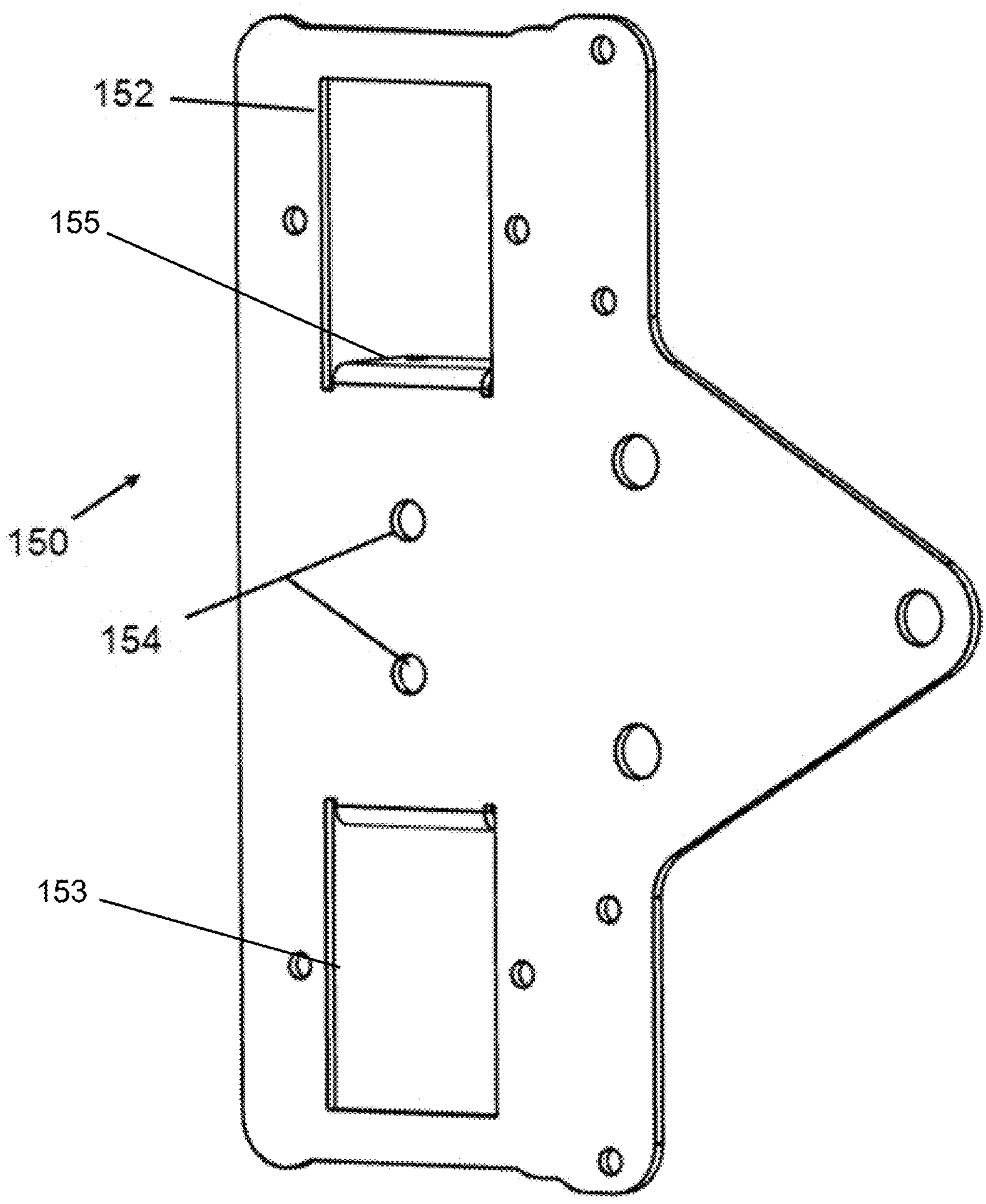
FIG. 20 is a perspective of a retention plate of the locking assembly.

Referring to FIG. 20, the illustrated locking assembly 110 further comprises a retention plate 150 fastened to the support bracket 130 and the electronic lock 120. The retention plate 150 defines a cam shaft opening 152, a restraint opening 153, a pair of release bar mounting holes 154, and a restraint tab 155 at the lower end of the cam shaft opening that facilitate (i) overriding the electronic lock 120 via the toggle 128 and (ii) resisting unauthorized tampering with the locking assembly 110, as will be explained in further detail below.

Figure 21:
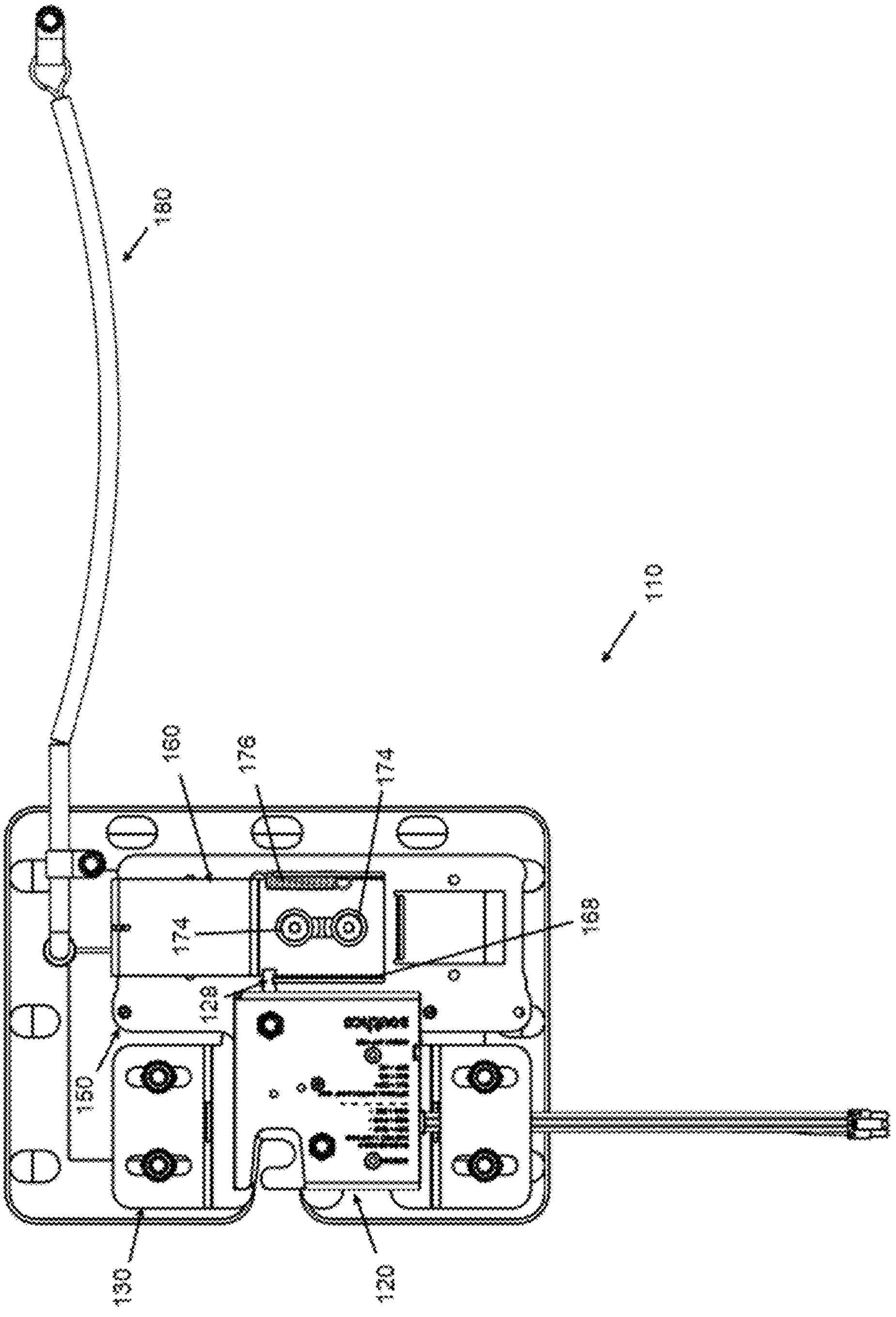
FIG. 21 is an elevation of the locking assembly wherein the base is removed.
Figure 22:
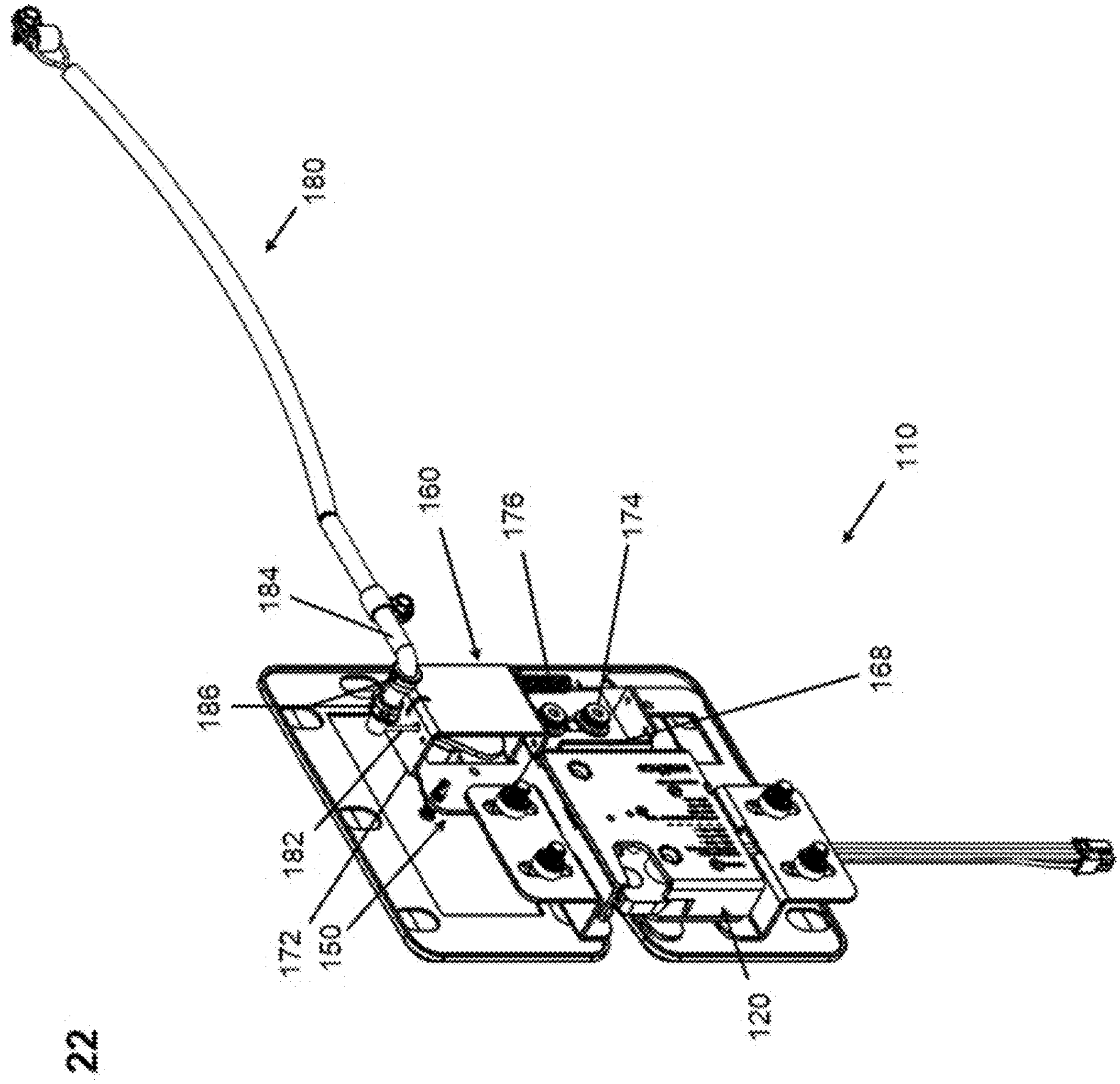
FIG. 22 is a perspective of the locking assembly wherein the base is removed.
Figure 23:
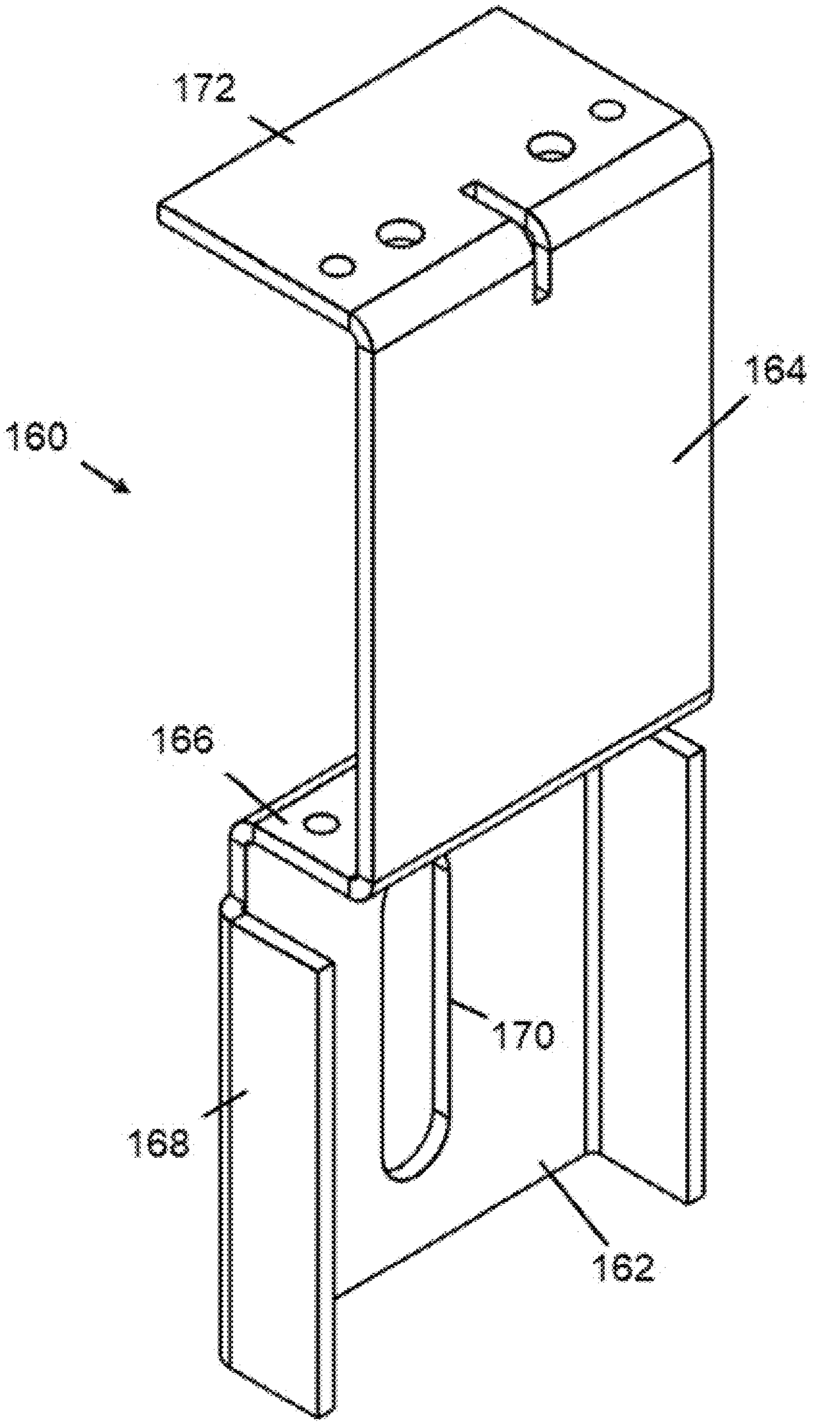
FIG. 23 is a perspective of a release bar of the locking assembly.

Referring to FIGS. 21-23, the locking assembly 110 also comprises a one-piece release bar 160. The release bar 160 is supported on the base 112 (e.g., by the retention plate 150) and movable relative to the base between a normal position shown in the drawings and a release position (not shown). In the drawings, the release bar 160 moves upward from the normal position to the release position. As will be explained in further detail below, the release bar 160 is configured to move the movable toggle 128 relative to the base 112 to override the electronic lock 120 as the release bar moves from the normal position to the release position.

The illustrated release bar 160 has comprises a lower body portion 162 and an upper body portion 164 connected by an offset web 166. The offset web 166 extend along the lateral axis A3 between the upper end of the lower body portion 162 and the lower end of the upper body portion 164 such that the upper body portion is offset from the lower body portion in a direction toward the interior storage compartment 18. A pair of flanges 168 extend transversely from the longitudinal sides of the lower body portion 162. The lower body portion 162 defines an elongate guide slot 170. A connection flange 172 extends transversely from the upper end of the upper portion 164. As will be explained in further detail below, the connection flange 172 is configured to connect the release bar 160 to at least first and second electronic lock override devices such that each of the first and second electronic lock override devices can independently move the release bar from the normal position to the release position.

Figure 13:
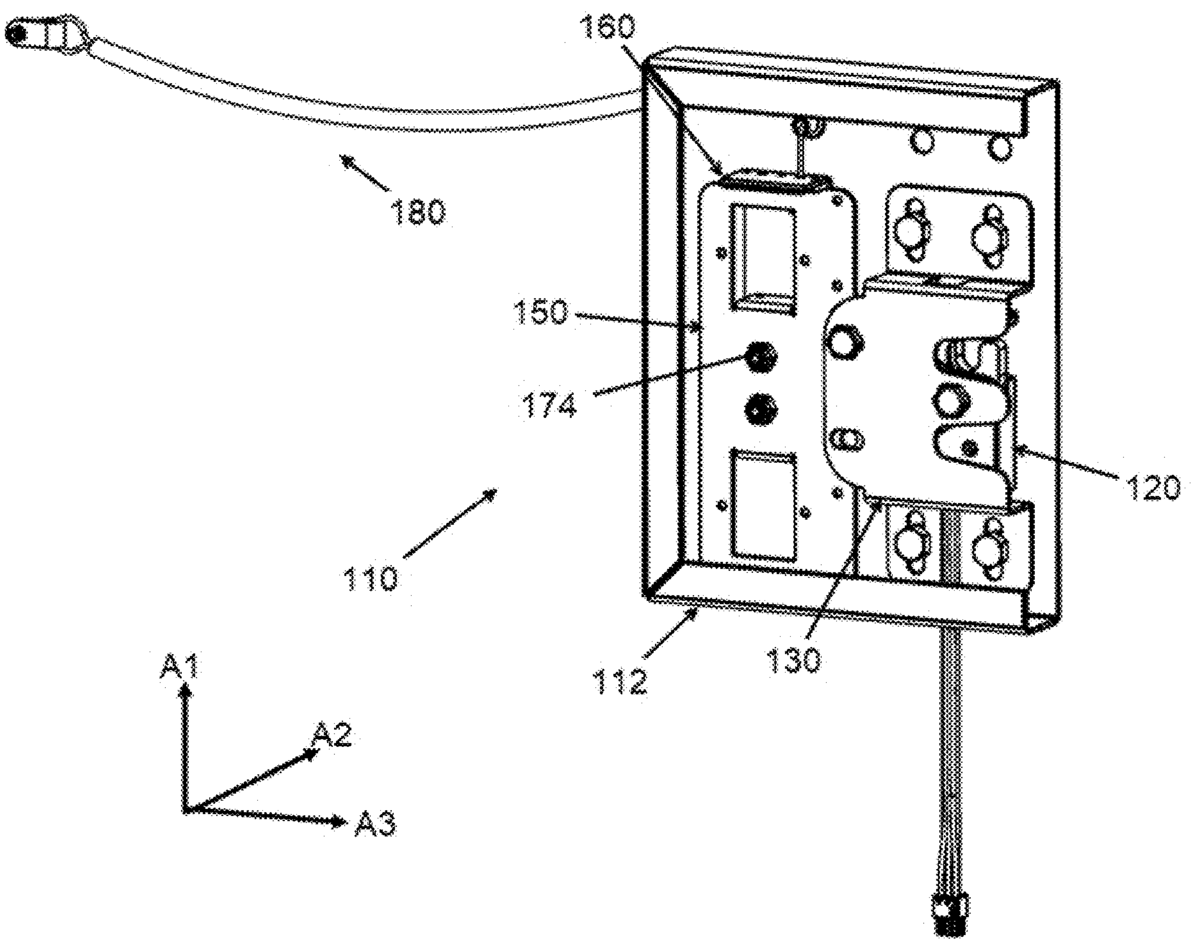
FIG. 13 is a perspective similar to FIG. 12 wherein the cover assembly is removed.
Figure 14:
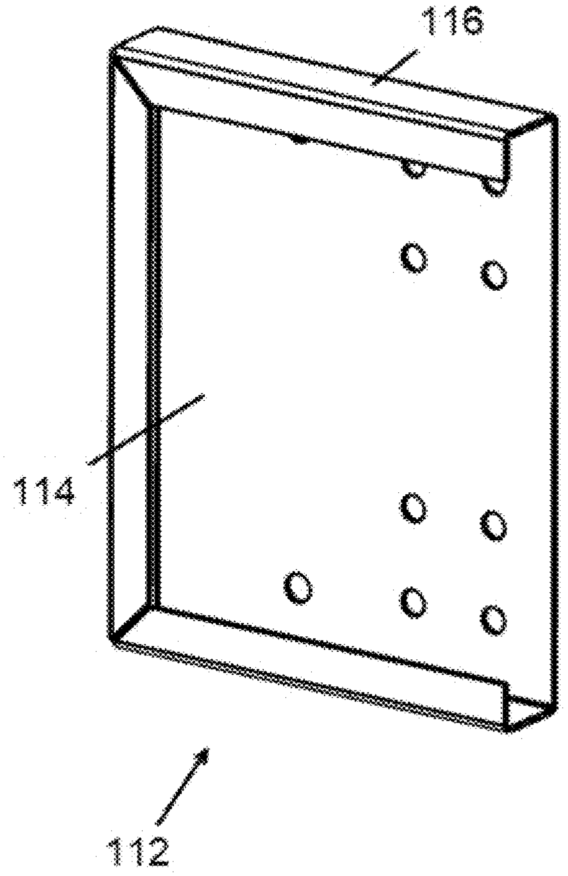
FIG. 14 is a perspective of a base of the locking assembly.

As shown in FIGS. 13 and 21, the retention plate 150 supports the release bar 160 on the base 112 for movement relative to the base between the normal position and the release position. In the illustrated embodiment, fasteners 174 (e.g., screws) extend through the mounting holes 154 of the retention plate 150 and are slidably received in the slot 170 of the release bar 160. The slot 170 is sized and shaped to allow the release bar 160 to slide vertically with respect to the fasteners 174 and the retention plate 150 within a range of motion that includes a lower end position in which the upper fastener 174 engages the release bar 160 at the upper end of the slot and an upper end position in which the lower fastener engages the release bar 160 at the lower end of the slot. In the illustrated embodiment, the normal position of the release bar is at the lower end position of the range of motion. The release position may be at the upper end position of the range of motion or a position spaced apart between the upper and lower end positions. A spring 176 is connected between the release bar 160 and the base 112 to yieldably bias the release bar 160 downward to the normal position. The release bar 160 is configured to move upward from the normal position to the release position, overcoming the biasing force of the spring 176. The upper end of the flange 168 opposite the spring 176 is located immediately below the override toggle 128 of the electronic lock 120. Accordingly, when the release bar 160 moves upward from the normal position the release bar 168 lifts the toggle 128 and overrides a locking configuration of the electronic lock 120 to unlock the cabinet system 10.

Referring to FIG. 22, the locking assembly 110 further comprises an internally accessible emergency release 180 that is actuatable from inside the cabinet system to move the release bar 160 from the normal position to the release position, thereby overriding the electronic lock 120 to unlock the cabinet system. The illustrated emergency release 180 comprises a pull cable 182, but it is contemplated that other types of emergency release actuators (e.g., knobs, buttons) may also be used without departing from the scope of the disclosure. One end of the pull cable 182 is attached to the connection flange 172 of the release bar 160. The pull cable 182 extends upward from the connection flange 172 a short distance and then turns into a guide tube 184 that slidably channels the pull cable through the cabinet wall 30 to the interior storage compartment 18. In the illustrated embodiment, the guide tube 184 is secured by first and second snap bushings 186, the first of which is snapped on the end wall 114 of the base 112 and the second of which is snapped onto an inner panel of the cabinet wall 130. When the pull cable 182 is pulled from within the storage compartment 18 of the cabinet 14, it slides within the guide tube 184 and lifts the release bar upward from the normal positon to the release position. As explained above, this lifts the toggle 128 and overrides the electronic lock 120 to unlock the cabinet system 10 from inside the storage compartment 18.

Figure 12:
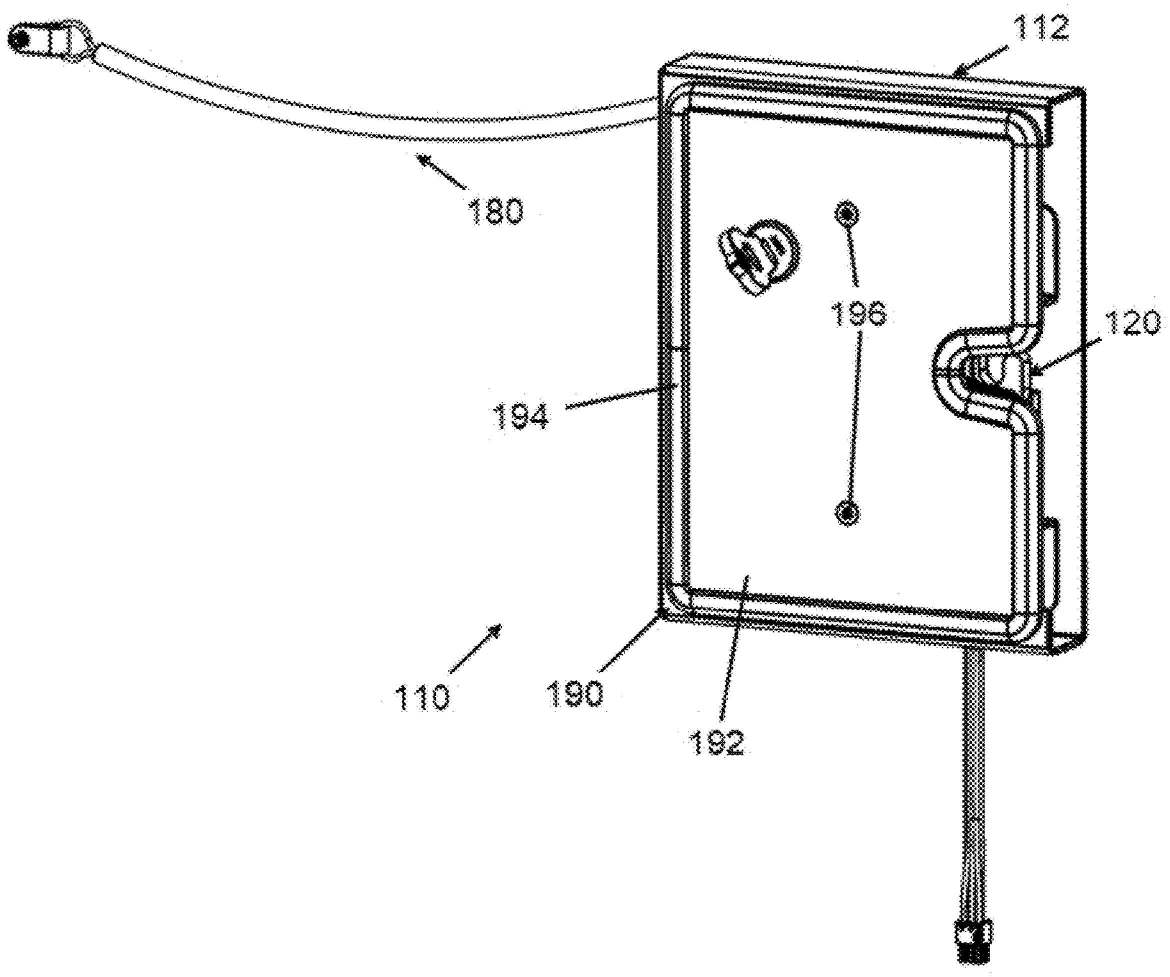
FIG. 12 is another perspective of the locking assembly.
Figure 24:
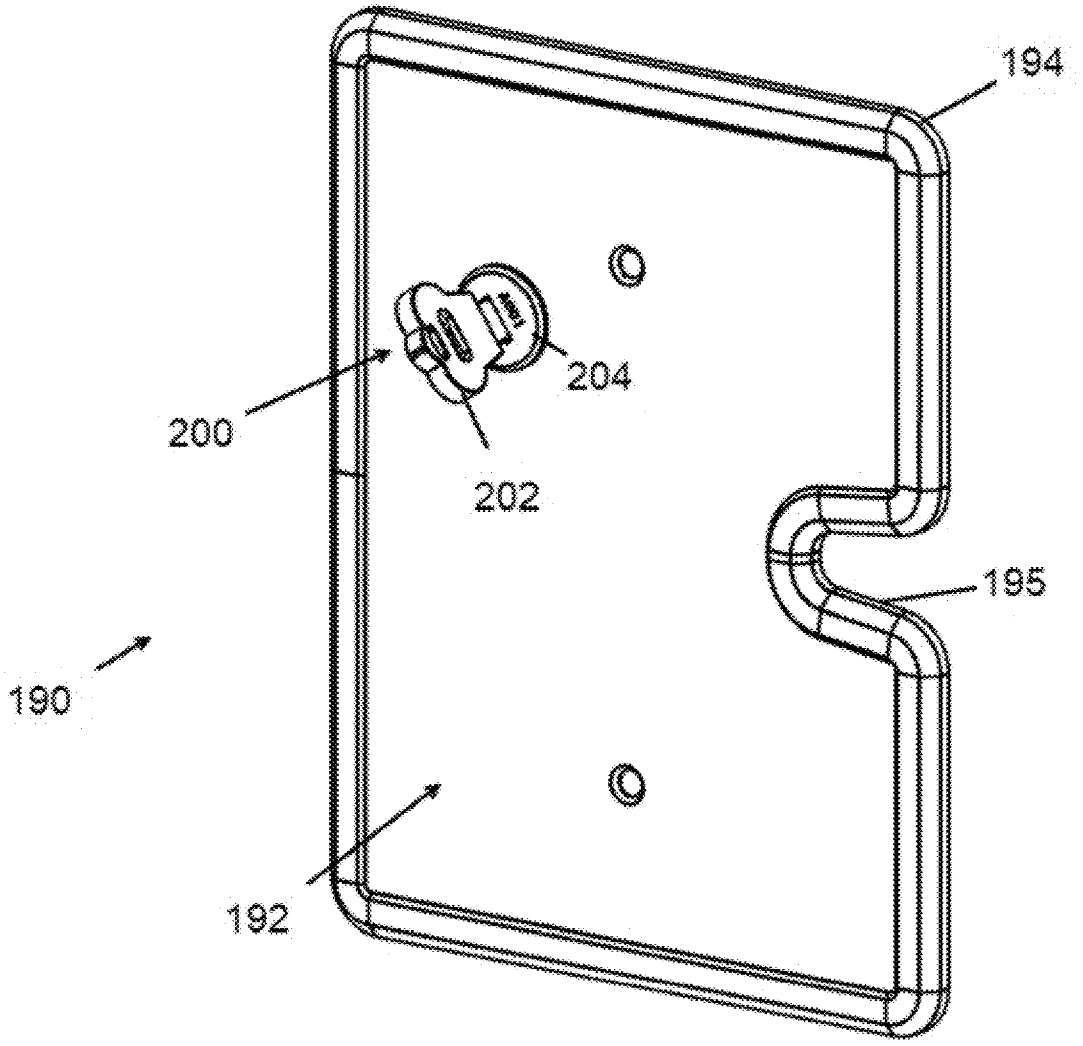
FIG. 24 is a perspective of the cover assembly.

Referring to FIGS. 12 and 24, the illustrated locking assembly 110 further comprises a cover assembly 190 that is generally configured to releasably connect to the electronic lock 120 for covering the cavity. The illustrated cover assembly 190 includes a cover plate 192 and a separate trim piece 194. The trim piece 194 defines the perimeter of the cover and sits flush upon the outer surface of the non-hinged sidewall 30 of the cabinet 14 (see FIG. 8). The trim piece 194 includes a strike recess 195 that is configured to align with the strike recess 124 of the electronic lock housing 122 when the cover 150 is connected to the electronic lock 120. Screws 196 (broadly, removable fasteners) releasably fasten the cover plate 192 to the retention plate 150. An inner perimeter margin of the trim piece 194 is sandwiched between the cover plate 192 and the cabinet sidewall 30 when the screws 196 fasten the cover plate 192 to the retention plate 150. As can be seen, by virtue of the retention plate 150 being fixed in position relative to the electronic lock 120, the removable cover assembly 190 is configured to releasably connect to the electronic lock 120 over the cavity 36 at a defined position in relation to the electronic lock. This ensures that the strike recess 195 always properly aligns with the strike recess 124 so that the cover assembly 190 never interferes with the strike 34 entering the strike recess 124. Moreover, it can be seen that the cover assembly 110 moves with the electronic lock 120 in relation to the base 112 and cabinet sidewall 30. In an exemplary embodiment, the cover assembly 110 is configured to cover the entire cavity 36 at every position within the above-described positioning range of the electronic lock 120 along the vertical axis A1 and the front-to-back axis A2. This provides a clean and attractive appearance and minimizes the profile of the locking assembly on the cabinet 14.

Figure 25:
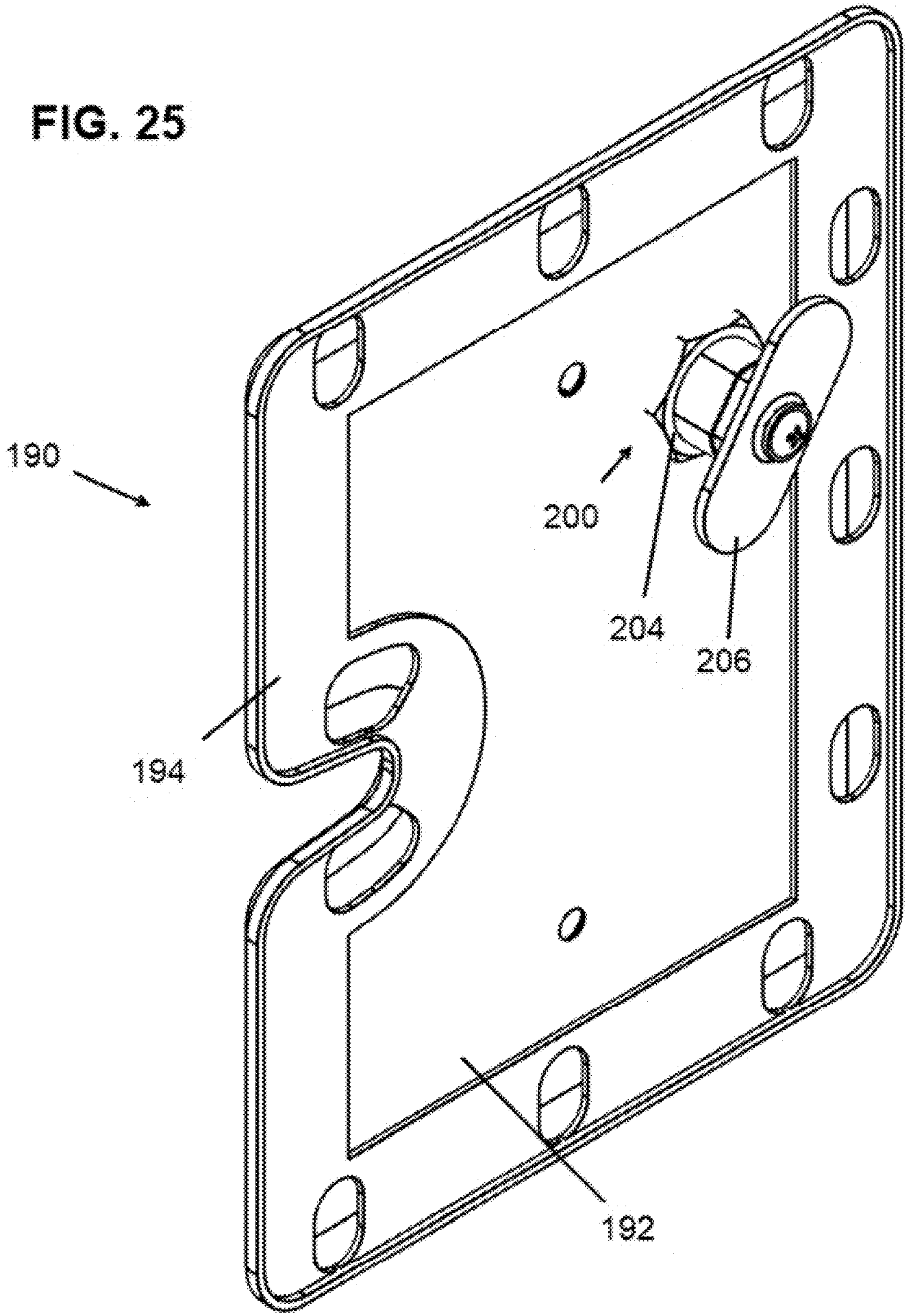
FIG. 25 is another perspective of the cover assembly.
Figure 26:
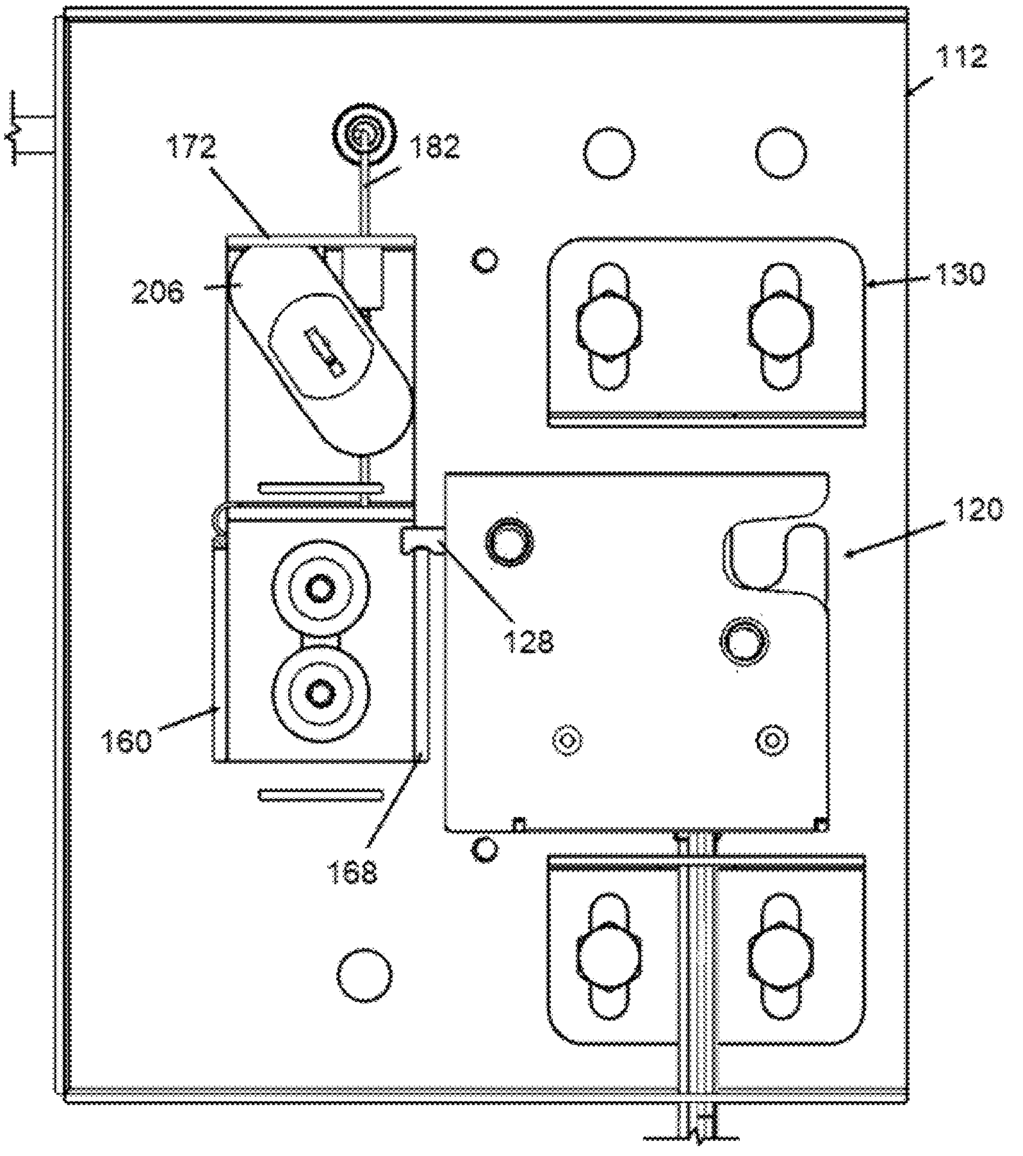
FIG. 26 is a cross section taken through the plane of line 26-26 of FIG. 18.

Referring to FIGS. 25 and 26, the illustrated cover assembly 190 further comprises a cam lock 200 adjustable by a key 202 from outside the cabinet system 10 between a locked position and an unlocked position. The cam lock 200 is fixed onto the cover plate 192 such that the cam lock extends from the cover plate through the cam shaft opening 152 in the retention plate 152 to a rotatable cam 206 at the end of the cam lock. The cam lock 200 comprises a lock set 204 configured to be actuated by the key 202 to rotate the cam 206 between the locked position and the unlocked position. FIG. 26 shows the cam lock 200 in the locked position. From the position shown in FIG. 26, the cam lock 200 rotates counterclockwise to the unlocked position. Referring to FIG. 22, when the cam lock 200 is in the locked position, the cam 206 is positioned to latch with the retention plate 150 to inhibit withdrawal of the cam lock through the cam shaft opening 152. More particularly, if the door 16 is closed and the electronic lock 120 is locked, even if the screws 196 are removed, the cam 206 would interfere with the retention plate 150 and not allow the cover plate to be removed. Thus, one feature of the cam lock 200 is that it provides a tamper-resistant closure of the locking assembly 110. To remove the cover assembly 110 from the cabinet 14 while the door 16 is closed, the key 202 must unlock the cam lock 200, which unlatches the cam 206 from the retention plate 150 so that it can pass through the cam shaft opening 152 in the retention plate 150. Subsequently, if the screws 196 are removed, the cover plate 192 and the cam lock 200 can be separated from the cabinet 14 and remainder of the locking assembly 110.

The cam lock 200 is also configured to function as an override device that can move the release bar 160 from the normal position to the release position to override the electronic lock 120 and unlock the cabinet system 10. Thus, the illustrated cam lock 200 functions both as a tamper-resistant lock and as an externally accessible/actuatable (keyed) override device for overriding the electronic lock. An upper portion of the cam 206 engages connection flange 172 of the release bar 160. As the cam 206 rotates from the locked position to the unlocked position, the upper portion presses the connection flange 172 upward and the release bar 160 moves as a follower along the upper portion of the cam. In the unlocked position of the cam lock 200, the cam 206 lifts the release bar 160 (overcoming the spring 176), which in turn lifts the toggle and overrides the electronic lock 120 to unlock the door 16.

Thus, in the illustrated embodiment, the emergency release 180 is a first override device for overriding the electronic lock 120 and the cam lock 200 is a second override device for overriding the electronic lock 120. Other override devices can also be used to move the release bar from the normal position to the release position in one or more embodiments. For instance, it is expressly contemplated that, in a cabinet system with multiple independently lockable storage compartments, a locking assembly 110 could be included for each door and an additional release device (not shown) could be provided that includes a linkage configured to simultaneously move the release bar 160 of each of the locking assemblies to simultaneously override all of the electronic locks 120. It is further contemplated that a cabinet system could include multiple dedicated externally accessible override devices for the same locking assembly. For instance, it may be desirable to include one externally accessible override device at the location of the cam lock 200 and also another externally accessible override device at another location along the cabinet (e.g., along the front of the cabinet). This provides multiple points of external override access that accommodates a deployment where one of the external override devices is covered by a blocking structure such as a building wall. It will be apparent to those skilled in the art that the release bar 160 provides a highly adaptable interface usable with various types of mechanical override devices.

Figure 27:
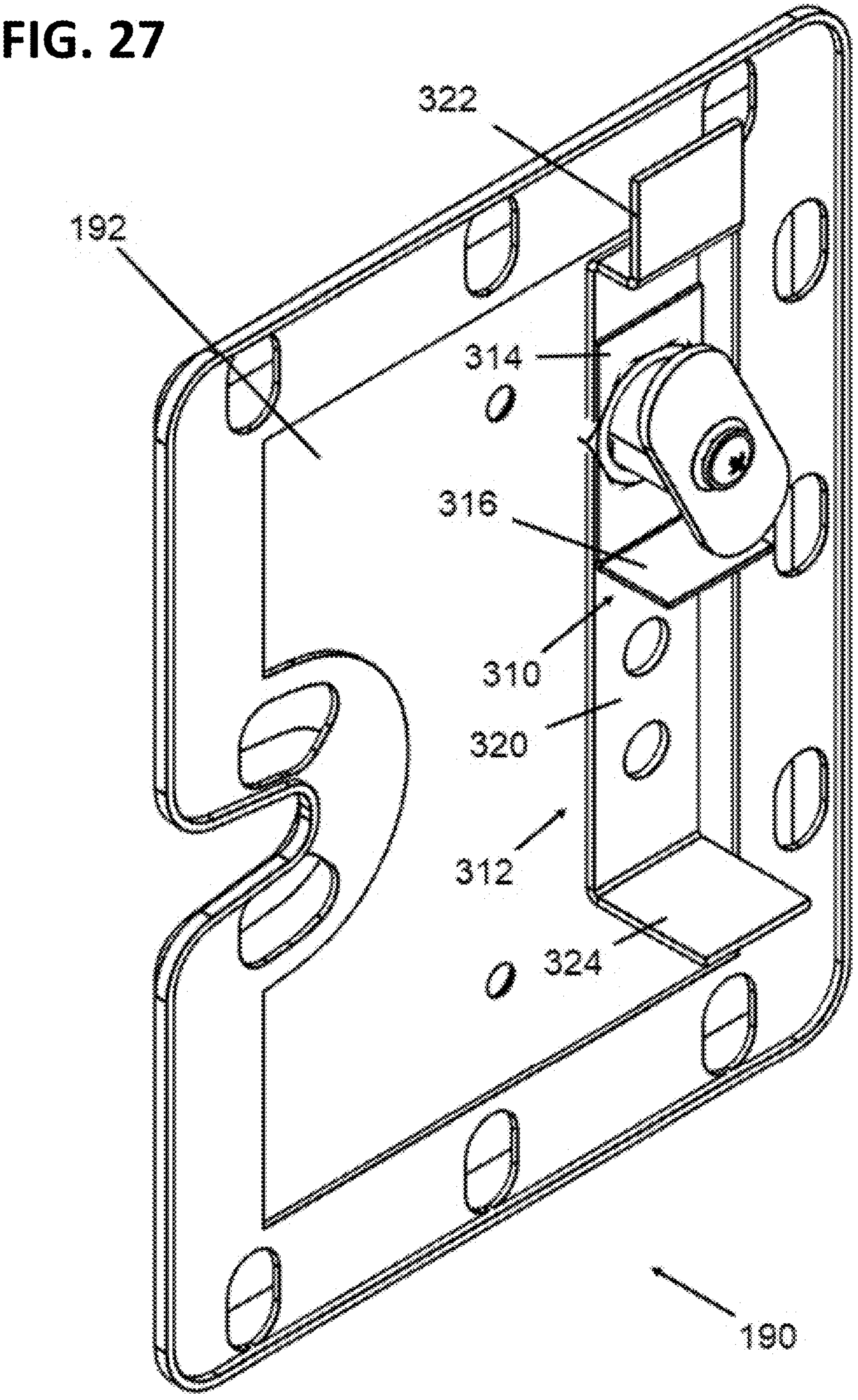
FIG. 27 is another perspective of the cover assembly wherein the cover assembly is fitted with additional restraints.
Figure 28:
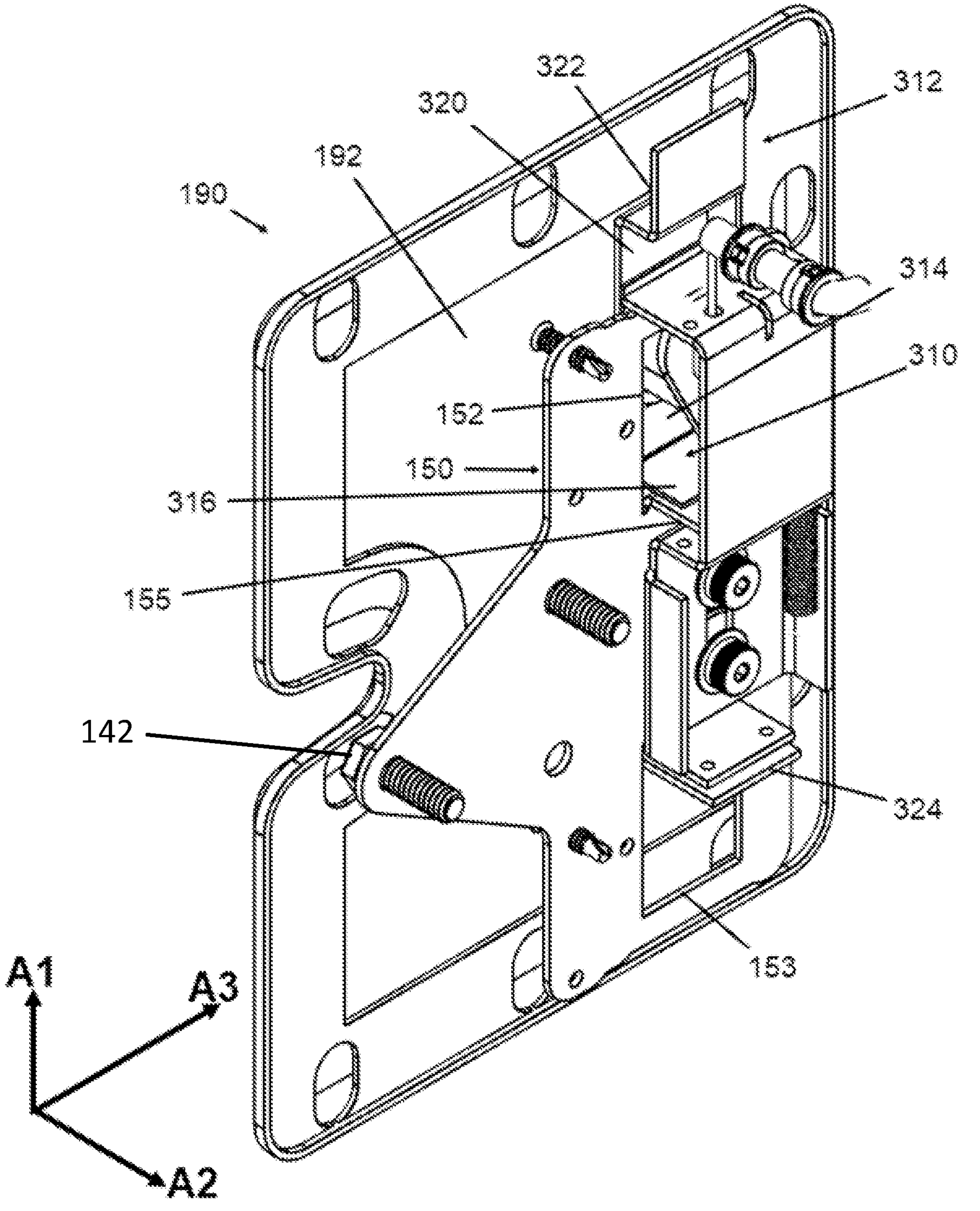
FIG. 28 is a perspective of the cover assembly as shown in FIG. 27, in combination with the release bar and the support bracket.
Figure 29:
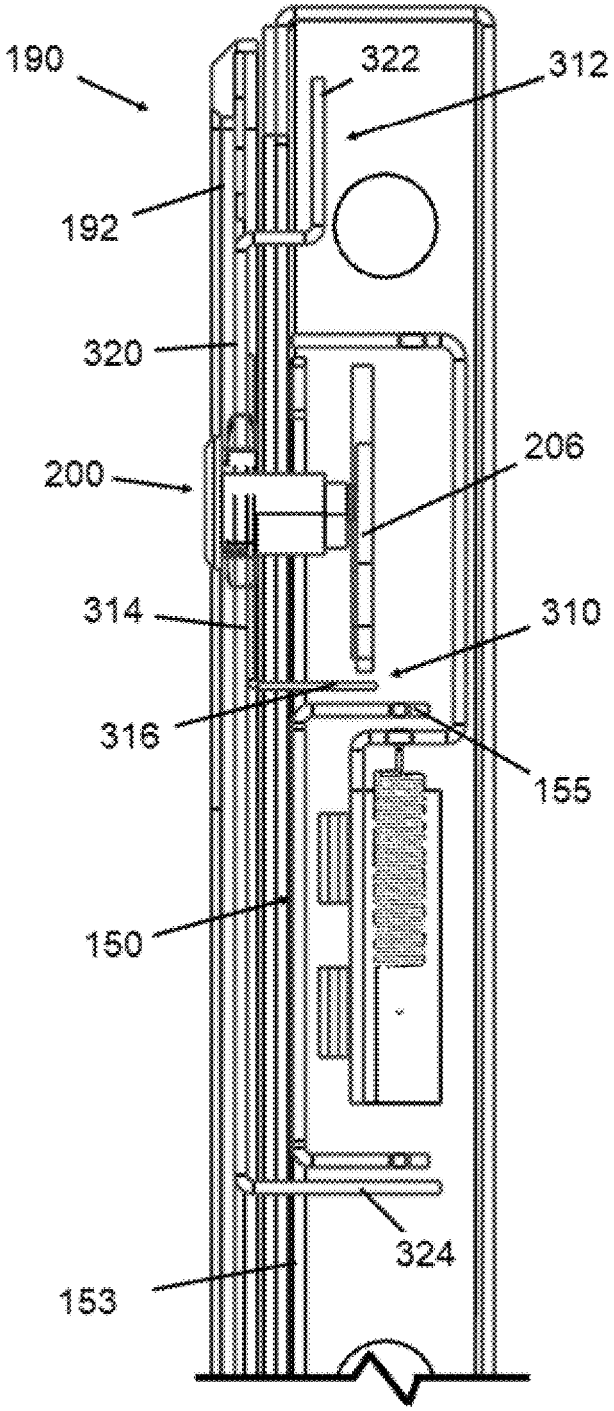
FIG. 29 is a cross-section of the locking assembly fitted with the restraints of FIG. 27.

Referring to FIGS. 27-29, to improve tamper-resistance, the cover assembly 110 can be modified to include one or more additional tamper restraints 310, 312. In the illustrated embodiment, the cover assembly includes a first tamper restraint 310 comprising an angle bracket including an upright portion 314 secured to the cover plate 192 and a flange 316 projecting inwardly along the axis A2 from the cover plate. When the cover assembly 190 is secured to the cabinet 14, the flange 316 is received immediately above the restraint tab 155 of the retention plate 150. Thus, if any attempt is made to move the cover assembly downward along the axis A1, the flange 316 will engage the restraint tab 155 and prevent such movement.

The second tamper restraint 312 comprises a bracket having an upright portion 320 secured to the cover plate, an L-shaped upper flange 322 extending from the upper end of the upright portion, and a lower flange 324 projecting inward along the axis A2 from the lower end of the upright portion. The L-shaped upper flange 322 is positioned to overlap the flange 116 of the base 112. If there is an attempt to pry open the upper edge of the cover assembly 190, the L-shaped upper flange 322 will engage the base flange 116, thereby preventing the cover assembly from being pried open. The lower flange 324 is received in the lower restraint opening of the 153 of the retention plate 150. If any attempt is made to twist/rotate the cover assembly 190 in the plane of the cover plate 192, the lower flange 324 will engage an inner edge of the retention plate 150 and thereby resist rotation of the cover plate. Thus, the illustrated cover assembly 190 with its additional restraints 310, 312 substantially inhibits any access to the interior of the locking assembly 110 (including by blocking line of sight into the interior of the locking assembly) unless the cam lock 200 is unlocked. When the cam lock 200 is unlocked, the bottom of the cover plate 192 can be pulled away from the sidewall, which enables the cam 206 to pass through the opening 152 and the cover assembly 190 to be removed from the cabinet 14.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A lockable cabinet system comprising:

a cabinet;

a door movably connected to the cabinet for opening and closing the cabinet, the door comprising a strike; and a locking assembly mounted on the cabinet and configured for selectively locking and unlocking the door by engagement with the strike when the door is closed, the locking assembly comprising:

a base configured to mount on the lockable cabinet system; and an electronic lock configured to be selectively actuated to lock and unlock the lockable cabinet system;

wherein the electronic lock is releasably fixable in relation to the base at a plurality of spaced apart positions;

wherein the locking assembly further comprises a support bracket releasably attachable to the base at a plurality of spaced apart positions along a first axis with respect to the base, the electronic lock being releasably attachable to the support bracket at a plurality of spaced apart positions along a second axis with respect to the support bracket, the second axis being transverse to the first axis, wherein the support bracket comprises a central cradle portion and opposite first and second flanges extending outward from the central cradle portion in opposing directions, each of the first and second flanges defining one or more first mounting slots extending lengthwise along the first axis, wherein the central cradle portion includes a planar segment parallel to the first and second flanges and offset from the first and second flanges along a third axis transverse to the first axis and the second axis;

wherein the locking assembly further comprises a retention plate and a one-piece release bar supported by the retention plate and configured to override the electronic lock.

2. The lockable cabinet system as set forth in claim 1, wherein the electronic lock has a positioning range along the first axis extending from a first end position along the first axis to a second end position along the first axis and wherein the electronic lock has a positioning range along the second axis extending from a first end position along the second axis to a second end position along the second axis.

3. The lockable cabinet system as set forth in claim 2, wherein the electronic lock is releasably fixable in relation to the base anywhere within (i) the positioning range along the first axis and (ii) the positioning range along the second axis.

4. The lockable cabinet system as set forth in claim 2, wherein the positioning range along the first axis is at least 0.25 inches and wherein the positioning range along the second axis is at least 0.25 inches.

5. A lockable cabinet system as set forth in claim 2, wherein the locking assembly further comprises an emergency release actuatable from inside the cabinet to unlock the lockable cabinet system independent of a state of the electronic lock.

6. A lockable cabinet system as set forth in claim 5, wherein the emergency release is actuatable from inside the cabinet to unlock the lockable cabinet system when the electronic lock is positioned at any position of the positioning range along the first axis and the positioning range along the second axis.

7. A lockable cabinet system as set forth in claim 2, wherein the positioning range along the first axis is at least 0.5 inches.

8. A lockable cabinet system as set forth in claim 2, wherein the positioning range along the second axis is at least about 0.5 inches.

9. A lockable cabinet system as set forth in claim 8, wherein the positioning range along the first axis is at least 0.5 inches.

10. The lockable cabinet system as set forth in claim 1, wherein the planar segment defines at least one second mounting slot extending lengthwise along the second axis, wherein the electronic lock is releasably attachable to the support bracket at the at least one second mounting slot.

11. The lockable cabinet system as set forth in claim 1, wherein the first axis a vertical axis and the second axis is a horizontal front-to-back axis.

12. The lockable cabinet system as set forth in claim 1, wherein the planar segment defines at least one second mounting slot extending lengthwise along the second axis.

13. The lockable cabinet system as set forth in claim 12, wherein the locking assembly further comprises a screw in each second mounting slot passing through the retention plate and being threadably fastened to the electronic lock, the screw in each second mounting slot linking the retention plate and the one-piece release bar to the electronic lock such that the retention plate and the one-piece release bar move with the electronic lock as the electronic lock is moved between the plurality of spaced apart positions in relation to the base.

14. A lockable cabinet system as set forth in claim 1, wherein the electronic lock comprises a lock housing and electronic lock mechanism enclosed in the lock housing.

15. A lockable cabinet system as set forth in claim 14, wherein the cabinet comprises an insulated wall.

16. A lockable cabinet system as set forth in claim 15, wherein the insulated wall has has an inner surface defining an interior of the cabinet, an outer surface defining an exterior of the cabinet, and wherein the insulated wall defines a cavity having a closed inner end, the locking assembly received in the cavity.

17. A lockable cabinet system as set forth in claim 16, wherein the electronic lock is located such that the inner end of the lock housing is separated from the closed inner end of the cavity by an air gap.

18. A lockable cabinet system as set forth in claim 17, further comprising a heater in the air gap outside of the lock housing.

19. A lockable cabinet system as set forth in claim 18, wherein the air gap has a dimension along the wall thickness of the insulated wall of at least 0.25 inches.

20. A lockable cabinet system as set forth in claim 17, wherein the air gap has a dimension along the wall thickness of the insulated wall of at least 0.25 inches.

* * * * *